US008009863B1

(12) United States Patent
Sharma et al.

(10) Patent No.: US 8,009,863 B1
(45) Date of Patent: Aug. 30, 2011

(54) METHOD AND SYSTEM FOR ANALYZING SHOPPING BEHAVIOR USING MULTIPLE SENSOR TRACKING

(75) Inventors: Rajeev Sharma, State College, PA (US); Satish Mummareddy, Washington, DC (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 730 days.

(21) Appl. No.: 12/215,877

(22) Filed: Jun. 30, 2008

(51) Int. Cl.
*G06K 9/00* (2006.01)
(52) U.S. Cl. .................. 382/100; 382/107; 348/159
(58) Field of Classification Search .................. 382/100, 382/103, 107, 110; 348/143, 150, 159; 340/573.1
See application file for complete search history.

(56) References Cited

U.S. PATENT DOCUMENTS

| | | | |
|---|---|---|---|
| 6,741,973 B1 | 5/2004 | Dove et al. | 706/13 |
| 6,967,674 B1* | 11/2005 | Lausch | 348/143 |
| 7,904,477 B2 | 3/2011 | Jung et al. | 707/790 |
| 2002/0085092 A1 | 7/2002 | Choi et al. | 348/77 |
| 2002/0135484 A1* | 9/2002 | Ciccolo et al. | 340/573.1 |
| 2002/0178085 A1 | 11/2002 | Sorensen | 705/26 |
| 2003/0002712 A1 | 1/2003 | Steenburgh et al. | 382/103 |
| 2003/0053659 A1 | 3/2003 | Pavlidis et al. | 382/103 |
| 2003/0058339 A1 | 3/2003 | Trajkovic et al. | 348/155 |
| 2004/0113933 A1 | 6/2004 | Guler | 345/716 |
| 2004/0120581 A1 | 6/2004 | Ozer et al. | 382/224 |
| 2004/0131254 A1 | 7/2004 | Liang et al. | 382/181 |
| 2006/0010028 A1 | 1/2006 | Sorensen | 705/10 |
| 2007/0229663 A1* | 10/2007 | Aoto et al. | 348/155 |
| 2008/0175482 A1* | 7/2008 | Ma et al. | 382/190 |
| 2009/0222388 A1* | 9/2009 | Hua et al. | 706/12 |

OTHER PUBLICATIONS

U.S. Appl. No. 12/011,650, filed Jan. 2008, Mummareddy, et al.
H. Buxton, et al., "Advanced visual surveillance using Bayesian Networks," in International Conference on Computer Vision, 1995, Cambridge, Massachusetts, 12pp.
A. Cohn, et al., "Towards an architecture for cognitive vision using qualitative spatio-temporal representations and abduction," Spatial Cognition III, 2003, 17pp.

(Continued)

*Primary Examiner* — Andrew W Johns

(57) ABSTRACT

The present invention is a method and system for automatically analyzing the behavior of a person and a plurality of persons in a physical space based on measurement of the trip of the person and the plurality of persons on input images. The present invention captures a plurality of input images of the person by a plurality of means for capturing images, such as cameras. The plurality of input images is processed in order to track the person in each field of view of the plurality of means for capturing images. The present invention measures the information for the trip of the person in the physical space based on the processed results from the plurality of tracks and analyzes the behavior of the person based on the trip information. The trip information can comprise coordinates of the person's position and temporal attributes, such as trip time and trip length, for the plurality of tracks. The physical space may be a retail space, and the person may be a customer in the retail space. The trip information can provide key measurements as a foundation for the behavior analysis of the customer along the entire shopping trip, from entrance to checkout, that deliver deeper insights about the customer behavior. The focus of the present invention is given to the automatic behavior analytics applications based upon the trip from the extracted video, where the exemplary behavior analysis comprises map generation as visualization of the behavior, quantitative category measurement, dominant path measurement, category correlation measurement, and category sequence measurement.

28 Claims, 22 Drawing Sheets

OTHER PUBLICATIONS

J. Fernyhough, et al., "Event recognition using qualitative reasoning on automatically generated spatio-temporal models from visual input," in IJCAI 97 Workshop on Spatial and Temporal Reasoning, 1997, Nagoya, 9pp.

J. Fernyhough, et al., "Constructing qualitative event models automatically from video input, Image and vision computing," 18, pp. 81-103, 2000.

N. Friedman, et al., "Image segmentation in video sequences: A probabilistic approach," in Thirteenth Conference on Uncertainty in Artificial Intelligence, 1997, 13pp.

A. Galata, et al., "Modeling interaction using learnt qualitative spatio-temporal relations and variable length Markov Models," in European Conference on Artificial Intelligence, 2000, Lyon, 5pp.

S. G. Gong, et al., "Bayesian Nets for mapping contextual knowledge to computational constraints in motion segmentation and tracking," in British Machine Vision Conference, 1993, Guildford, England, 1 6pp.

W. E. L. Grimson, et al., "Using adaptuve tracking to classify and monitor activities in a site," in IEEE Conference on Computer Vision and Pattern Recognition, 1998, pp. 22-29.

Y. A. Ivanov, et al., "Recognition of visual activities and interactions by Stochastic Parsing," IEEE Trans. on Pattern Analysis and Machine Intelligence 2000, 22(8), pp. 852-872, 2000.

D. Moore, et al., "Recognizing multitasked activities using Stochastic context-free grammar," in Workshop on Models versus Exemplars in Computer Vision held in conjunction with IEEE CVPR 2001, Kauai, Hawaii, 10pp.

C. Stauffer, et al., Adaptive background mixture models for real-time tracking, IEEE Computer Society Conference on Computer Vision and Pattern Recognition (CVPR'99), 1999 (2), pp. 246-252.

\* cited by examiner

| | CAT. 1 | CAT. 2 | CAT. 3 | CAT. 4 | ... | CAT. 14 | CAT. 15 |
|---|---|---|---|---|---|---|---|
| TYPE 1 | 2232 | 394 | 514 | 1330 | ... | 633 | 1245 |
| TYPE 2 | 953 | 176 | 218 | 321 | ... | 55 | 765 |
| TYPE 3 | 57 | 23 | 53 | 212 | ... | 4 | 73 |
| RATIO1 | 42.70 | 44.67 | 42.41 | 24.14 | ... | 8.69 | 61.45 |
| RATIO2 | 5.98 | 13.07 | 24.31 | 66.04 | ... | 7.27 | 9.54 |

| CAT. A | BEHAVIOR MEASUREMENT DURING WINDOW OF TIME W1 (T1~Tn) | | | | | |
|---|---|---|---|---|---|---|
| CUST. 1 | (C1,PB, P1) | (C2,PB, P2) | (C3,L2, P3) | ... | (C4,PB, P4) | |
| CUST. 2 | (C1,PB, P1) | (C3,L2, P3) | (C2,PB, P2) | ... | (C4,PB, P4) | (C5,L3, P5) |
| ⋮ | | | ... | | | |
| CUST. I-1 | | (C1,PB, P1) | (C4,L2, P4) | ... | (C3,PB, P3) | (C3,PB, P3) |
| CUST. I | (C4,PB, P4) | (C3,L3, P3) | (C2,L2, P2) | (C1,PB, P1) | | |

— 308

⋮

| CAT. A | BEHAVIOR MEASUREMENT DURING WINDOW OF TIME Wp (T1~Tn) | | | | | |
|---|---|---|---|---|---|---|
| CUST. 1 | (C2,PB, P2) | (C3,PB, P3) | (C1,L2, P1) | ... | (C1,PB, P1) | |
| ⋮ | | | ... | | | |
| CUST. J-1 | | (C1,PB, P1) | (C3,L2, P3) | ... | (C4,L2, P4) | (C5,PB, P5) |
| CUST. J | (C2,PB, P2) | (C1,PB, P1) | (C3,L2, P3) | ... | (C4,PB, P4) | |
| ⋮ | | | ... | | | |
| CUST. K | | (C3,L3, P3) | (C2,PB, P2) | ... | (C1,PB, P1) | (C3,PB, P3) |

|       | CAT. 1 | CAT. 2 | CAT. 3 | CAT. 4 | CAT. 5 |
|-------|--------|--------|--------|--------|--------|
| CAT. 1 |       | 15     | 45     | 56     | 21     |
| CAT. 2 | 54    |        | 91     | 32     | 12     |
| CAT. 3 | 95    | 34     |        | 21     | 9      |
| CAT. 4 | 73    | 27     | 8      |        | 5      |
| CAT. 5 | 65    | 89     | 84     | 3      |        |

761

UNIT: INTEGER (COUNT)

TOTAL COUNT: 839

|       | CAT. 1 | CAT. 2 | CAT. 3 | CAT. 4 | CAT. 5 |
|-------|--------|--------|--------|--------|--------|
| CAT. 1 |        | 1.79%  | 5.36%  | 6.67%  | 2.50%  |
| CAT. 2 | 6.44%  |        | 10.85% | 3.81%  | 1.43%  |
| CAT. 3 | 11.32% | 4.05%  |        | 2.50%  | 1.07%  |
| CAT. 4 | 8.70%  | 3.22%  | 0.95%  |        | 0.60%  |
| CAT. 5 | 7.75%  | 10.61% | 10.01% | 0.36%  |        |

762

UNIT: %

763

|             | RANKING |||||
|-------------|---------|---------|---------|---------|-----|
|             | 1       | 2       | 3       | 4       | ... |
| CAT. TUPLE  | (CAT. 1, CAT. 3) | (CAT. 1, CAT. 4) | (CAT. 2, CAT. 3) | (CAT. 2, CAT. 5) | ... |
| COMB. %     | 16.69%  | 15.38%  | 14.90%  | 12.04%  | ... |

Fig. 18

|  TO<br>FROM  | CAT. 1 | CAT. 2 | CAT. 3 | CAT. 4 | CAT. 5 | ... | CAT. 14 | CAT. 15 |
|---|---|---|---|---|---|---|---|---|
| CAT. 1 |  | 394 | 514 | 130 | - | ... | - | - |
| CAT. 2 | 21 |  | 338 | 321 | - | ... | - | - |
| CAT. 3 | 57 | 123 |  | 212 | 328 | ... | - | - |
| CAT. 4 | 21 | 384 | 63 |  | 483 | ... | - | - |
| CAT. 5 | - | - | 38 | 356 |  | ... | - | - |
| ... | ... | ... | ... | ... | ... | ... | ... | ... |
| CAT. 14 | - | - | - | - | - | ... |  | 230 |
| CAT. 15 | - | - | - | - | - | ... | 824 |  |

781

| POSITION IN SEQUENCE | CAT. 1 | CAT. 2 | CAT. 3 | ... | CAT. N |
|---|---|---|---|---|---|
| POSITION 1 | 51 |  | 712 | ... | 415 |
| POSITION 2 | 240 | 117 |  | ... | 86 |
| POSITION 3 | 138 |  | 3370 | ... | 230 |

782

UNIT: INTEGER (COUNT)

783

METHOD AND SYSTEM FOR ANALYZING SHOPPING BEHAVIOR USING MULTIPLE SENSOR TRACKING

BACKGROUND OF THE INVENTION

1. Field of the Invention

The present invention is a method and system for automatically analyzing the behavior of people in a physical space based on the information for the trip of the people, by capturing a plurality of input images of the people by a plurality of means for capturing images, processing the plurality of input images in order to track the people in each field of view of the plurality of means for capturing images, and finding information for the trip of the people based on the processed results from the plurality of tracks, where the exemplary behavior analysis comprises map generation as visualization of the behavior, quantitative category measurement, dominant path measurement, category correlation measurement, and category sequence measurement.

2. Background of the Invention

Shoppers' Behavior Analysis:

U.S. Pat. Appl. Pub. No. 2006/0010028 of Sorensen (hereinafter Sorensen 2006/0010028) disclosed a method for tracking shopper movements and behavior in a shopping environment using a video. In Sorensen 2006/0010028, a user indicated a series of screen locations in a display at which the shopper appeared in the video, and the series of screen locations were translated to store map coordinates. The step of receiving the user input via input devices, such as a pointing device or keyboard, makes Sorensen 2006/0010028 inefficient for handling a large amount of video data in a large shopping environment with a relatively complicated store layout, especially over a long period of time. The manual input by a human operator/user cannot efficiently track all of the shoppers in such cases, not to mention the possibility of human errors due to tiredness and boredom. Also, the manual input approach is not scalable according to the number of shopping environments to handle.

Although U.S. Pat. Appl. Pub. No. 2002/0178085 of Sorensen (hereinafter Sorensen 2002/0178085) disclosed a usage of a tracking device and store sensors in a plurality of tracking systems primarily based on wireless technology, such as RFID, Sorensen 2002/0178085 is clearly foreign to the concept of applying computer vision-based tracking algorithms to the field of understanding customers' shopping behavior and movement.

In Sorensen 2002/0178085, each transmitter was typically attached to a handheld or push-type cart. Therefore, Sorensen 2002/0178085 cannot distinguish the behaviors of multiple shoppers using one cart from the behavior of a single shopper also using one cart. Although Sorensen 2002/0178085 disclosed that the transmitter may be attached directly to a shopper via a clip or other form of customer surrogate in order to help in the case where the customer is shopping without a cart, this will not be practical due to the additionally introduced cumbersome step to the shopper, not to mention the inefficiency of managing the transmitter for each individual shopper.

U.S. Pat. No. 6,741,973 of Dove, et al. (hereinafter Dove) disclosed a model of generating customer behavior in a transaction environment. Although Dove disclosed video cameras in a real bank branch as a way to observe the human behavior, Dove is clearly foreign to the concept of automatic and real-time analysis of the customers' behavior based on visual information of the customers in a retail environment, such as shopping path tracking and analysis.

U.S. Pat. Appl. Pub. No. 2003/0053659 of Pavlidis, et al. (hereinafter Pavlidis) disclosed a method for moving object assessment, including an object path of one or more moving objects in a search area, using a plurality of imaging devices and segmentation by background subtraction. In Pavlidis, the object included customers. Pavlidis was primarily related to monitoring a search area for surveillance.

U.S. Pat. Appl. Pub. No. 2004/0120581 of Ozer, et al. (hereinafter Ozer) disclosed a method for identifying the activity of customers for marketing purposes or the activity of objects in a surveillance area, by comparing the detected objects with the graphs from a database. Ozer tracked the movement of different object parts and combined them to high-level activity semantics, using several Hidden Markov Models (HMMs) and a distance classifier. U.S. Pat. Appl. Pub. No. 2004/0131254 of Liang, et al. (hereinafter Liang) also disclosed the Hidden Markov Models (HMMs) as a way, along with rule-based label analysis and the token parsing procedure, to characterize behavior in their disclosure. Liang disclosed a method for monitoring and classifying actions of various objects in a video, using background subtraction for object detection and tracking. Liang is particularly related to animal behavior in a lab for testing drugs. Neither Ozer nor Liang disclosed a method or system for tracking people in a physical space using multiple cameras.

Activity Analysis in Various Other Areas, such as Surveillance Application

There have been earlier attempts for activity analysis in various other areas than understanding customers' shopping behavior, such as surveillance and security applications.

The following prior arts are not restricted to the application area for understanding customers' shopping behaviors in a targeted environment, but they disclosed methods for object activity modeling and analysis for a human body, using a video, in general.

U.S. Pat. Appl. Pub. No. 2002/0085092 of Choi, et al. (hereinafter Choi) disclosed a method for modeling an activity of a human body using the optical flow vector from a video and probability distribution of the feature vectors from the optical flow vector. Choi modeled a plurality of states using the probability distribution of the feature vectors and expressed the activity based on the state transition.

U.S. Pat. Appl. Pub. No. 2004/0113933 of Guler disclosed a method for automatic detection of split and merge events from video streams in a surveillance environment. Guler considered split and merge behaviors as key common simple behavior components in order to analyze high-level activities of interest for surveillance application, which are also used to understand the relationships among multiple objects, and not just individual behavior. Guler used adaptive background subtraction to detect the objects in a video scene, and the objects were tracked to identify the split and merge behaviors. To understand the split and merge behavior-based, high-level events, Guler used a Hidden Markov Model (HMM).

The prior arts lack the features for automatically analyzing the trips of people in a physical space, by capturing multiple input images of the people by multiple means for capturing images and tracking the people in each field of view of the means for capturing images, while joining the track segments across the multiple fields of views and mapping the trips on to the coordinates of the physical space. Essentially, the prior arts lack the features for finding the information of the trips of the people based on the automatically processed results from the plurality of tracks using computer vision algorithms. Therefore, a novel usage of computer vision technologies for understanding the shoppers' trips in a more efficient manner in a physical space, such as a retail environment, is needed.

With regard to the temporal behavior of customers, U.S. Pat. Appl. Pub. No. 2003/0002712 of Steenburgh, et al. (hereinafter Steenburgh) disclosed a method for measuring dwell time of an object, particularly a customer in a retail store, which enters and exits an environment, by tracking the object and matching the entry signature of the object to the exit signature of the object, in order to find out how long people spend in retail stores, using a stereo vision camera. Although Steenburgh is limited to a stereo vision camera, the method in Steenburgh can be used as one of the many exemplary methods to measure the dwell time of people in a physical space. However, Steenburgh is clearly foreign to the idea of analyzing the complex behavior of people in the physical space in combination with other measurement attributes such as trip information.

U.S. Pat. Appl. Pub. No. 2003/0058339 of Trajkovic, et al. (hereinafter Trajkovic) disclosed a method for detecting an event through repetitive patterns of human behavior. Trajkovic learned multidimensional feature data from the repetitive patterns of human behavior and computed a probability density function (PDF) from the data. Then, a method for the PDF analysis, such as Gaussian or clustering techniques, was used to identify the repetitive patterns of behavior and unusual behavior through the variance of the Gaussian distribution or cluster.

Although Trajkovic can model a repetitive behavior through the PDF analysis, Trajkovic is clearly foreign to the aggregate of non-repetitive behaviors, such as the shopper traffic in a physical store. The shopping path of an individual shopper can be repetitive, but each shopping path in a group of aggregated shopping paths of multiple shoppers is not repetitive. Trajkovic is clearly foreign to the challenges that can be found in a retail environment.

A novel usage of computer vision technologies for understanding the shoppers' behavior in a physical space by automatically analyzing the trips of people in the physical space is disclosed in the present invention. The present invention also includes novel methods to extract analytical and statistical data from the trip information that construct various output representations.

SUMMARY

The present invention is a method and system for automatically analyzing the behavior of a person and a plurality of persons in a physical space based on measurement of the trip of the person and the plurality of persons on input images. The present invention captures a plurality of input images of the person by a plurality of means for capturing images, such as cameras. The plurality of input images is processed in order to track the person in each field of view of the plurality of means for capturing images. The present invention measures the information for the trip of the person in the physical space based on the processed results from the plurality of tracks, and analyzes the behavior of the person based on the trip information.

The steps are repeated for each person in a plurality of persons in order to measure the behavior of the plurality of persons by aggregating the trip information for each person.

In the present invention, the "trip" is defined as a person's movement across multiple fields of view of multiple means for capturing images, such as cameras, from entrance to exit, such as exit through a checkout, in a physical space. In the present invention, the trip information comprises coordinates of positions and temporal attributes, such as trip time and trip length, of the plurality of tracks for the person.

Although the application area of the present invention is not limited to any particular application domain, the physical space where the embodiment of the present invention can be deployed may be a retail space, and the person may be a customer in the retail space.

In such a case, it is an objective of the present invention to provide key behavior analysis measurements along the entire shopping trip, from entrance to checkout, that deliver deeper insights about the behaviors of the customers, based on the automatically and efficiently measured trip information.

The present invention extracts analytical and statistical data from the trip information, comprising:
a) a traffic distribution,
b) a shopping distribution,
c) a shopping conversion,
d) a category-level traffic distribution,
e) a category-level shopping distribution, and
f) a category-level shopping conversion.

The analytical and statistical data can be used to process various types of behavior analyses that comprise map generation as visualization of the behavior, quantitative category measurement, dominant path measurement, category correlation measurement, and category sequence measurement.

The map generation is based on the analytical and statistical data, comprising:
a traffic distribution map that shows penetration of the person or the plurality of persons throughout the physical space,
a shopping distribution map that shows the activity of the person or the plurality of persons throughout the physical space,
a shopping conversion map that shows traffic of the person or the plurality of persons converted to shopping,
a category-level traffic distribution map,
a category-level shopping distribution map, and
a category-level shopping conversion map.

The present invention can analyze the stopping power based on the temporal attributes, whereby the temporal attributes comprise trip time and trip length. The stopping power can be defined as the power to influence a person to stop at a certain location.

The present invention augments the trip information by domain specific knowledge. Application of the domain specific knowledge comprises:
a) a step of adding behavioral attributes, calculated by the analysis of the tracking of the person, to the trip information, and
b) a step of removing irrelevant data from the trip information.

In an exemplary embodiment, the present invention can utilize a rule application module for analyzing the trip information and processing the behavior analysis. The rule application module comprises information unit verification technologies.

DRAWINGS

Figures

FIG. 14 shows an exemplary behavior measurement for an exemplary category based on the customers' interactions with sub-categories in the category during different windows of time through a plurality of exemplary tables for behavior measurement.

FIG. 18 shows exemplary data measured in the process for the category correlation measurement in the present invention.

DETAILED DESCRIPTION OF THE INVENTION

Figure 1:
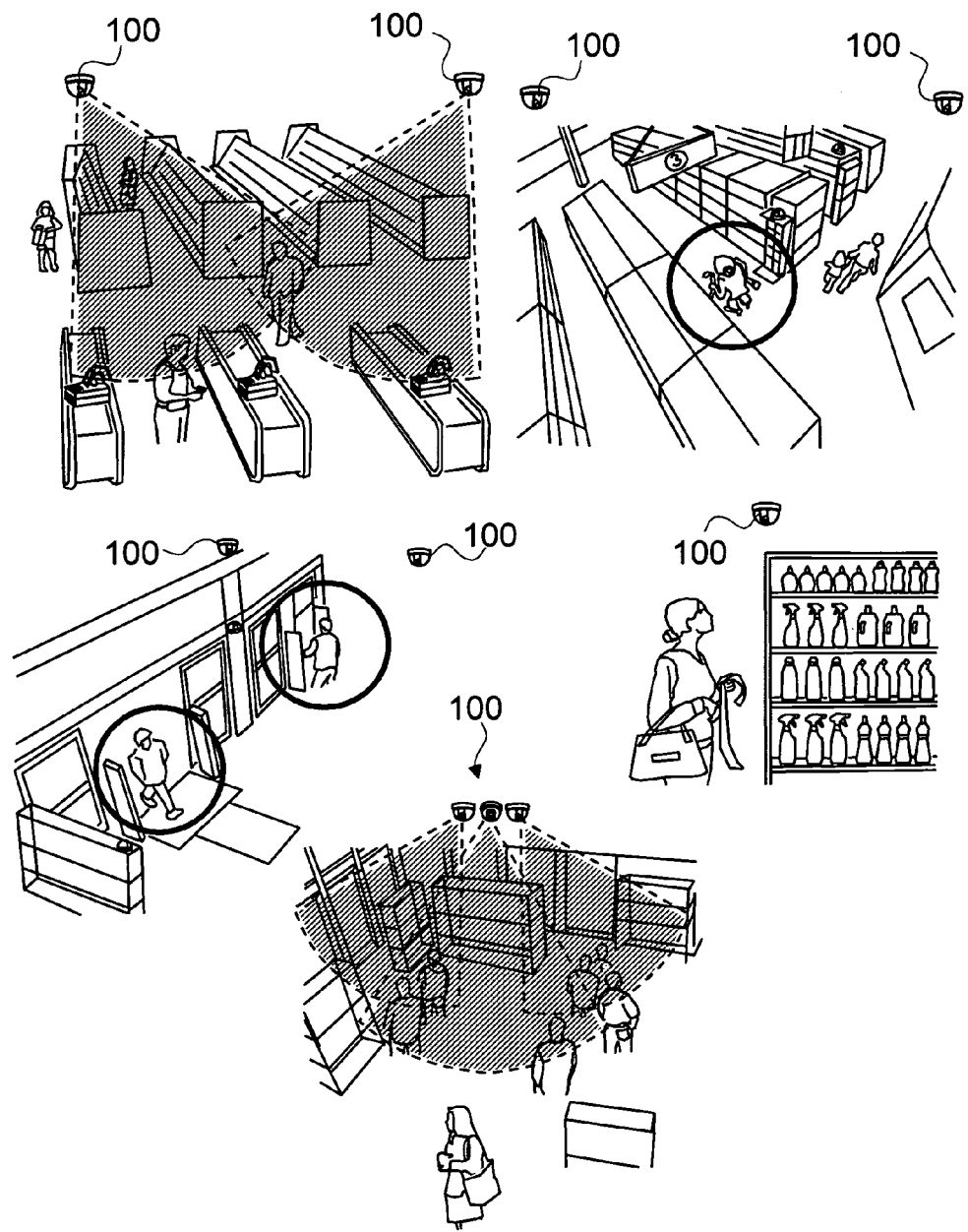
FIG. 1 shows applications of a preferred embodiment of the invention, where the present invention analyzes the behavior of at least a person based on the trip information on the video images captured by multiple means for capturing images.

FIG. 1 shows applications of a preferred embodiment of the invention, where the present invention analyzes the behavior of at least a person in various physical spaces, based on the trip information on the video images captured by multiple means for capturing images 100.

The present invention is a method and system for automatically analyzing the behavior of a person and a plurality of persons in a physical space based on measurement of the trip of the people on input images.

In an exemplary embodiment shown in FIG. 1, the present invention captures a plurality of input images of the person by a plurality of means for capturing images 100, such as cameras. The plurality of input images is processed in order to track the person in each field of view of the plurality of means for capturing images 100. The present invention measures the information for the trip of the person in the physical space based on the processed results from the plurality of tracks, and analyzes the behavior of the person based on the trip information.

The steps are repeated for each person in a plurality of persons in order to measure the behavior of the plurality of persons, i.e. a group of people, by aggregating the trip information for each person.

In the present invention, the "trip" is defined as a person's movement across multiple fields of view of multiple means for capturing images 100, such as cameras, from entrance to exit, such as exit through a checkout, in a physical space. In the present invention, the trip information comprises coordinates of positions and temporal attributes, such as trip time and trip length, of the plurality of tracks for the person.

The present invention can utilize an efficient method and system for automatic analysis of the trip of people using multiple cameras, such as U.S. patent application Ser. No. 12/011,650 of Mummareddy, et al. (hereinafter Mummareddy).

The application area of the present invention is not limited to any particular application domain or space, and it could be deployed to various types of physical spaces, including but not limited to a retail space or any other public space. In an exemplary application of the present invention that appears in this document, the physical space where the embodiment of the present invention is deployed may be a retail space, and the person or a plurality of persons may be a customer or customers, respectively, in the retail space. When the embodiment of the present invention is deployed to a retail space, it can be efficiently applied to automatically measure the shopping path of the customers during their visit to a retail store.

In such a case, it is an objective of the present invention to provide key behavior analysis measurements along the entire shopping trip, from entrance to checkout, that deliver deeper insights about the behaviors of the customers, based on the automatically and efficiently measured trip information.

The present invention extracts analytical and statistical data from the trip information, comprising:
a) a traffic distribution,
b) a shopping distribution,
c) a shopping conversion,
d) a category-level traffic distribution,
e) a category-level shopping distribution, and
f) a category-level shopping conversion.

The analytical and statistical data can be used to process various types of behavior analyses. The behavior analyses comprise:
1) map generation: display of qualitative visualization for store designer for overall shopping behavior,
2) quantitative measurement per category, such as a ratio between shopping interaction levels, e.g. level 2 over level 1, based on a category-level path analysis, 3) a dominant path measurement for the direction of the person or the plurality of persons in the physical space. The next region for the path direction can be defined as either point-level or polygon-level, depending on the predefined granularity of the next region, 4) a category correlation analysis that is defined as the optimal distance measure between categories shopped in a retail store application, and 5) a category sequence analysis that is the order of categories shopped. The sequence analysis shows the order of the customer's shopping engagement in a retail store application.

The map generation is based on the analytical and statistical data, and it comprises:

a traffic distribution map that shows penetration of the person or the plurality of persons throughout the physical space, a shopping distribution map that shows the activity of the person or the plurality of persons throughout the physical space, a shopping conversion map that shows traffic of the person or the plurality of persons converted to shopping, a category-level traffic distribution map, a category-level shopping distribution map, and a category-level shopping conversion map.

The present invention can analyze the stopping power based on the temporal attributes, whereby the temporal attributes comprise trip time and trip length.

Exemplary Trip Information in the Context of Shopping Path

The following exemplary behavioral patterns, which can be elements of the trip information, are explained in the context of the shopping path measurement in a retail store application.

Sequence

The sequencing pattern can be one of the behavioral attributes that the trip information can comprise.

With regard to this data, the trip information can comprise:

the areas of the store a customer has shopped most recently, the areas they are most likely to shop next, and a relevant combination of previously shopped areas.

This sequencing can be used to provide information for a product that has already been viewed or to reference a product that is likely to be viewed in the near future based on the customer's behavior—thus improving the probability of purchase for the product in a retail store.

Direction of Travel

In addition to sequence, direction of travel past a particular display can be used as the basis of a predicted shopping pattern of a customer.

Frequency

The behavioral analysis can also comprise information for multiple visits to a specific area in the physical space by the same customer. This frequency pattern might trigger a series of related but progressively engaging or informing market activities. For example, the frequency in the trip information can steadily build awareness of a given product and increase the probability of purchase for a particular product.

Temporal Measures such as Dwell Time

In-store activities can be tailored based on the length of time a customer spends in a given area. Using this data, market research and retail store plans can be correlated to the perceived activity of the customer, based on the customer's dwell time in a particular area.

Figure 2:
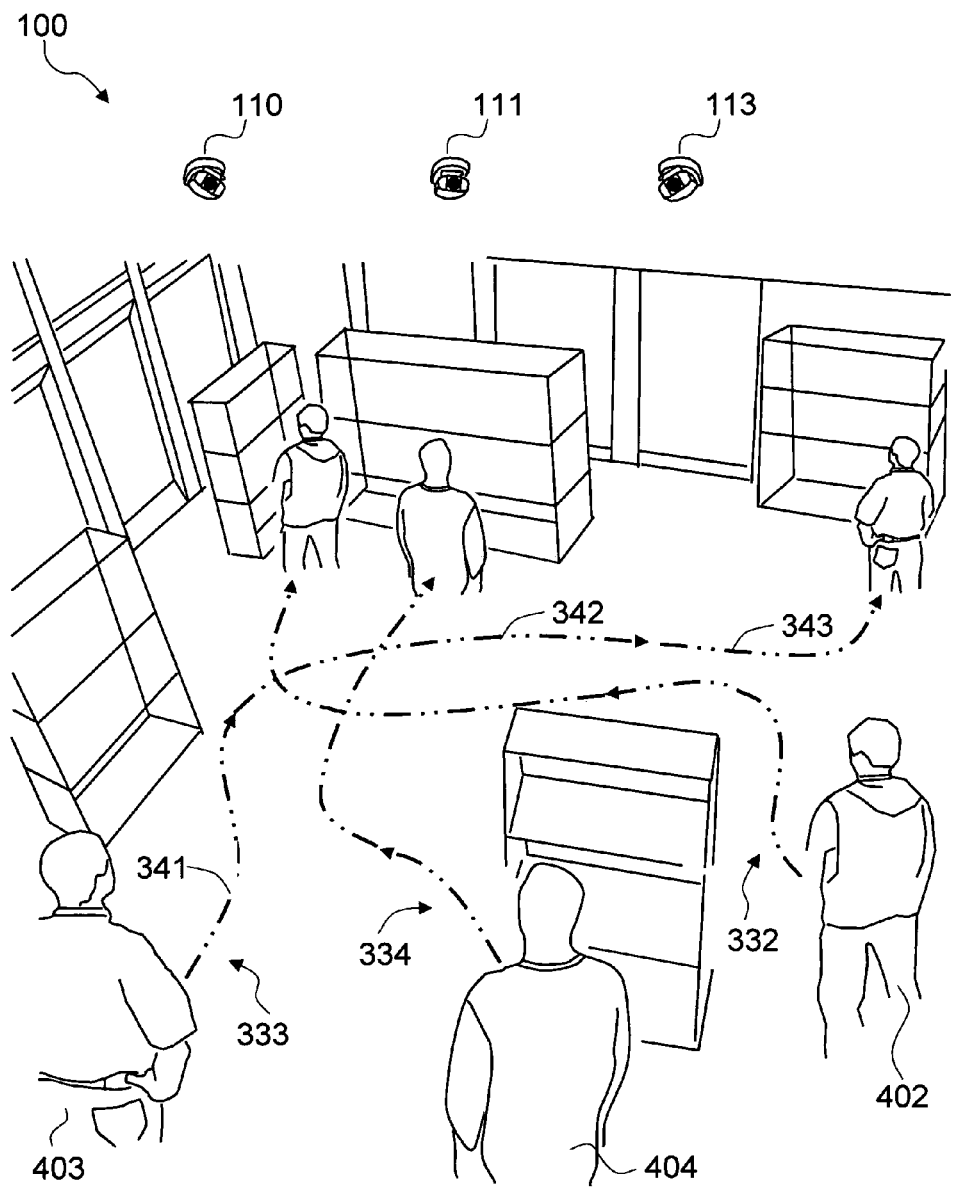
FIG. 2 shows an exemplary process of measuring the trip information of a group of people through the paths the people took in a physical space.

FIG. 2 shows an overview of an exemplary embodiment of the present invention, where the present invention measures the trip information of a group of persons through the paths the group of persons took in a physical space.

In the present invention, the behavior analysis is primarily based on the measurement of the trip information of the people in a physical space. The process for analyzing and extracting the trip information can be performed either at an individual person level or at a group of persons level, and the present invention can utilize any efficient method and system for automatic analysis of the trip of people using multiple cameras, such as in Mummareddy mentioned above.

In an exemplary embodiment, the present invention repeats the person tracking for each person that appears in the field of view of a plurality of means for capturing images 100. When the present invention detects that a group of persons is approaching a predefined area, the present invention can analyze the group behavior by the aggregated behavior analyses from the individual person tracking information.

For example, in the exemplary embodiment shown in FIG. 2, the present invention first captures a plurality of input images of the group of persons and their paths, such as "path A" 332, "path B" 333, and "path C" 334 for "person A" 402, "person B" 403, and "person C" 404, respectively, based on the individual tracking information in a physical space, such as a store, through a plurality of means for capturing images 100, such as "means for capturing images 1" 110, "means for capturing images 2" 111, and "means for capturing images N" 113. The present invention joins the sub-trajectories of the person tracks, such as "track 1" 341, "track 2" 342, and "track N" 343, from a video of a means for capturing images 100 to another video of a means for capturing images 100 while the person appears and disappears between the fields of view among a plurality of means for capturing images 100 to form a complete path of a person, such as "path B" 333. Then, the present invention processes said plurality of input images in order to analyze the trip information of the group of persons. Further, the present invention utilizes the trip information as the basis for analyzing the behaviors of the people.

The group behavior analysis can be decided by a set of predefined rules, such as a majority rule, in which the major characteristics among the aggregated individual behavior analyses represent the behavior for the entire group.

The present invention can also utilize more sophisticated rule application approaches than the simple rule application. For example, in the exemplary embodiment, the present invention can utilize a rule application module for processing the group behavior analysis.

The logic module enables dynamic rule application, where the group behavior analysis can be adjusted in a much easier and more structured way whenever there is a need for changes in the rules, which represents the group behavior analysis criteria, defined in the module, rather than relying on an ad hoc solution or static hard codes. An exemplary rule application module can be implemented utilizing the information unit verification technologies in U.S. patent application Ser. No. 11/999,649 of Jung, et al. (hereinafter Jung 11/999,649).

Figure 3:
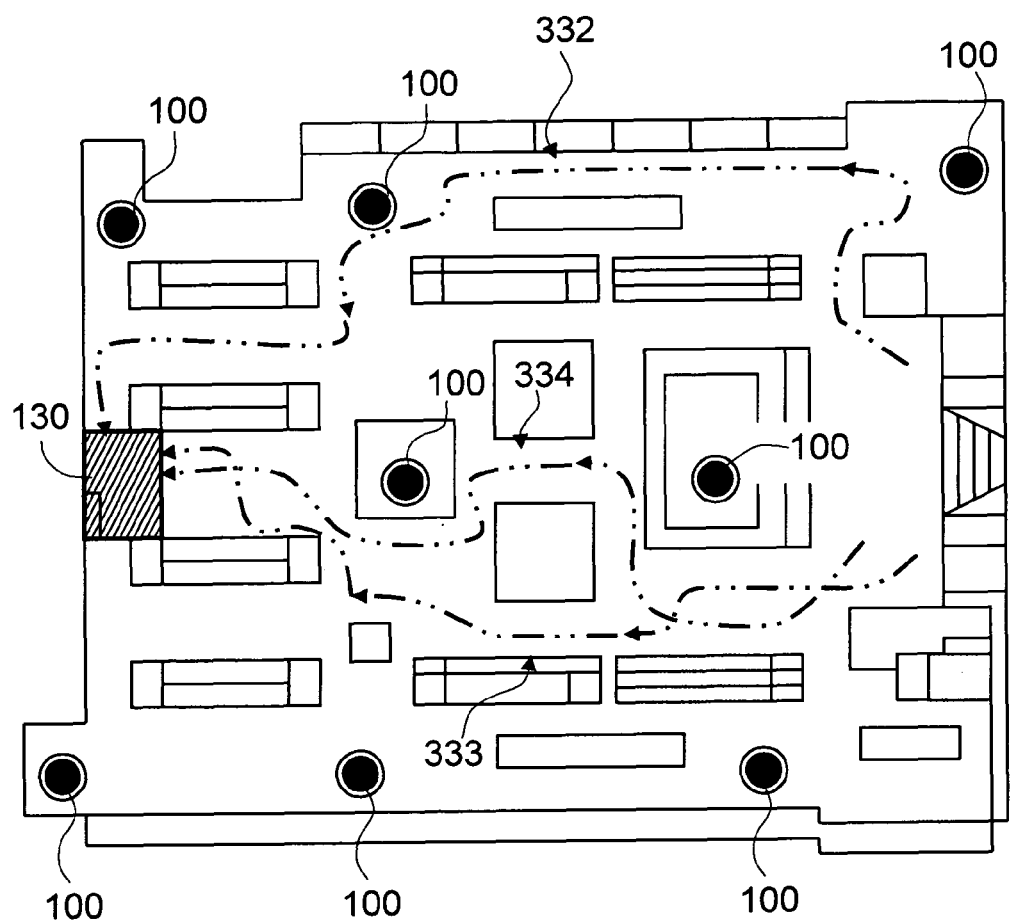
FIG. 3 shows an exemplary layout view of the trip measurement in a physical space, where each person of a plurality of persons in the physical space is tracked through arrays of means for capturing images in an exemplary embodiment of the present invention.

FIG. 3 shows an exemplary layout view of the trip measurement in a physical space, where each person of a plurality of persons in the physical space is tracked through arrays of means for capturing images 100 in an exemplary embodiment of the present invention.

Utilizing the methods disclosed in Mummareddy, the present invention tracks each person in a physical space. As shown in FIG. 3, in the exemplary embodiment of the present invention, the target object 130 can be installed separately from the means for capturing images 100. This capability for the separation of the device locations makes the layout of equipment installation flexible.

The present invention can also associate the sequence of the paths with the customer input and response, whereby the association provides valuable marketing data to the owner of the system, with regard to the target object 130 or the paths.

Figure 4:
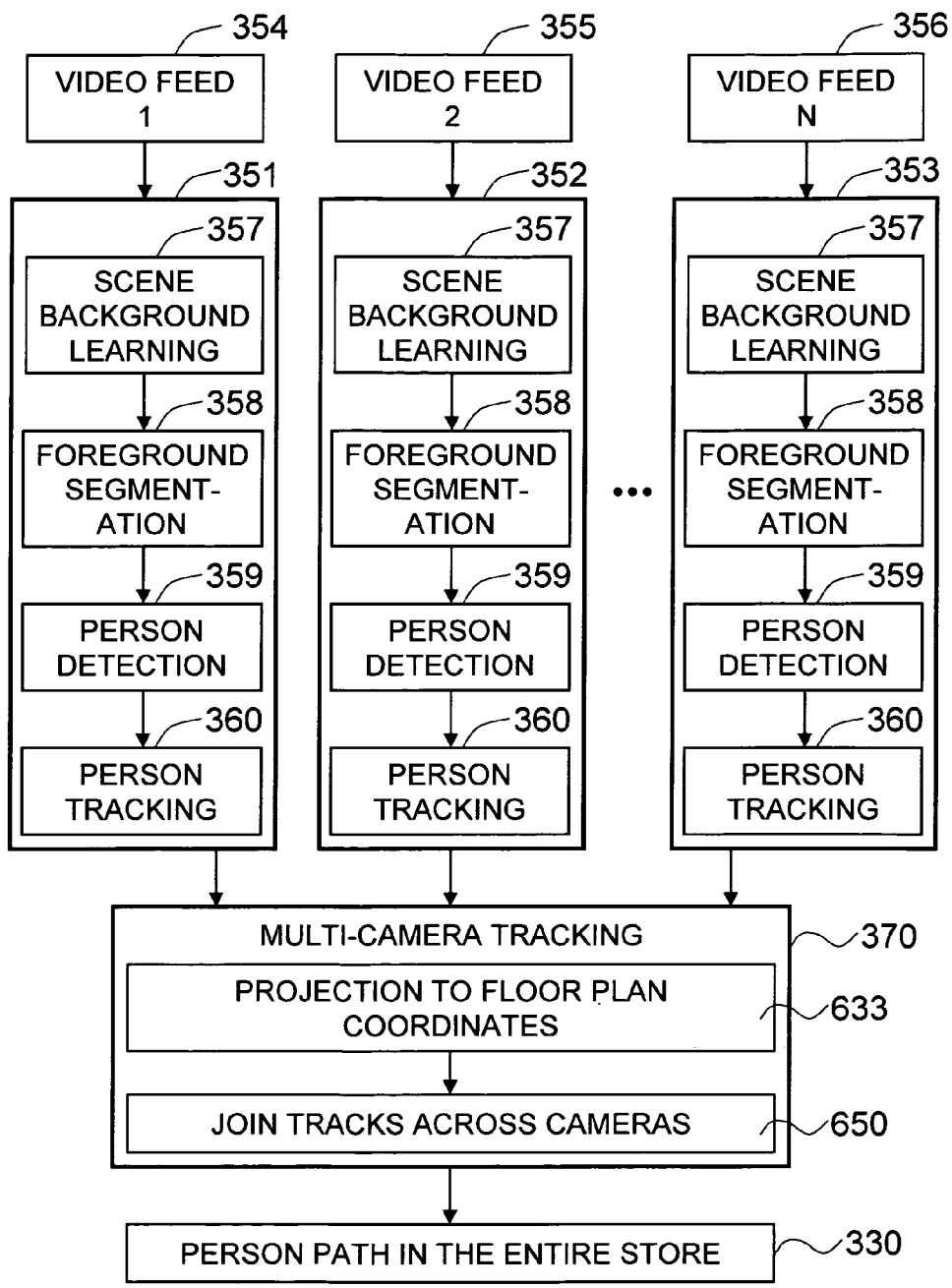
FIG. 4 shows an exemplary process of tracking and trip information measurement for a single person or a group of persons using multiple means for capturing images in a preferred embodiment of the invention.

FIG. 4 shows an exemplary process of tracking and trip information measurement for a single person or a group of persons using multiple means for capturing images 100 in a preferred embodiment of the invention.

Person Detection

Person detection in a scene involves temporal segmentation of foreground objects from the scene and then identifying person objects inside the foreground regions, where an intuitive representation of the store itself is considered background and everything else foreground. A plurality of streams of video frames are processed, "video feed 1" 354, "video feed 2" 355, and "video feed N" 356 as shown in FIG. 4, and each pixel within the video frame is analyzed based on its temporal motion information. Each pixel is then modeled as a series of Gaussian distributions with a mean and a standard deviation at the scene background learning 357 process. This approach is shown in the following prior art works: W. E. L. Grimson, et al., "Using Adaptive Tracking to Classify and Monitor Activities in a Site," in IEEE Conference on Computer Vision and Pattern Recognition, 1998; C. Stauffer, et al., (hereinafter Stauffer), "Adaptive Background Mixture Models for Real-Time Tracking," CVPR, p. 2246, 1999 IEEE Computer Society Conference on Computer Vision and Pattern Recognition (CVPR'99)—Volume 2, 1999; and N. Friedman, "S.R. Image Segmentation in Video Sequences: A Probabilistic Approach," in Thirteenth Conf. on Uncertainty in Artificial Intelligence, 1997.

Pixel values falling near one of the Gaussian means are statistically likely to be background pixels, while the remaining pixels will be classified as foreground.

After a background model has been created for each pixel through the scene background learning 357, foreground segmentation 358 can be performed on future frames. Further processing is performed on the foreground segmentation 358 images in order to detect 359 and track 360 people.

Further details of the single camera tracking, such as "single camera person tracking 1" 351, "single camera person tracking 2" 352, and "single camera person tracking N" 353, can utilize the exemplary methods disclosed in Mummareddy (Mummareddy from FIG. 10 to FIG. 15).

The possibility for erroneous foreground pixels exists due to changes in lighting or the environment. Thus, not every group of foreground pixels may belong to an actual person. To handle this problem, a template-based approach is used in the exemplary embodiment of the present invention.

Figure 5:
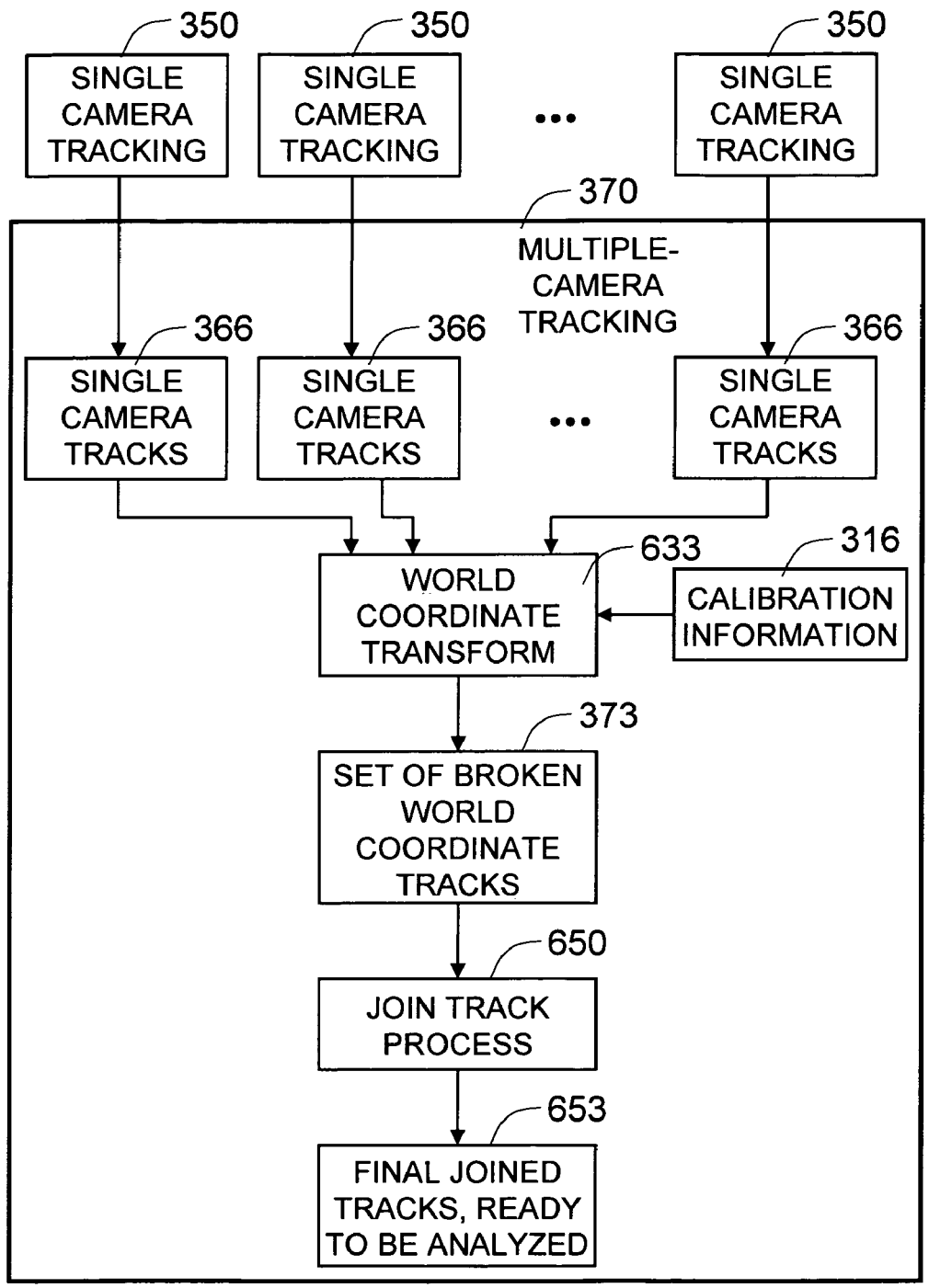
FIG. 5 shows an exemplary process of tracking using multiple means for capturing images and an exemplary join process for the multiple tracks in a preferred embodiment of the invention.

The multi-camera tracking 370 steps are further explained with regard to the following FIG. 5.

FIG. 5 shows an exemplary process of tracking using multiple means for capturing images 100 and an exemplary join process for the multiple tracks in a preferred embodiment of the invention.

After the single camera tracking 350 step, the present invention aggregates and transforms 633 the series of coordinates in the field of view of the means for capturing images in each tracking to the world coordinates, which eventually creates a set of broken world coordinate tracks 373. The join track process 650 joins the set of broken world coordinate tracks 373, and the final joined tracks are ready to be analyzed 653 for shopper behavior in a physical space.

Exemplary details of the steps in the multi-camera tracking 370 can utilize the exemplary methods disclosed in Mummareddy (Mummareddy from FIG. 11 to FIG. 18).

Figure 6:
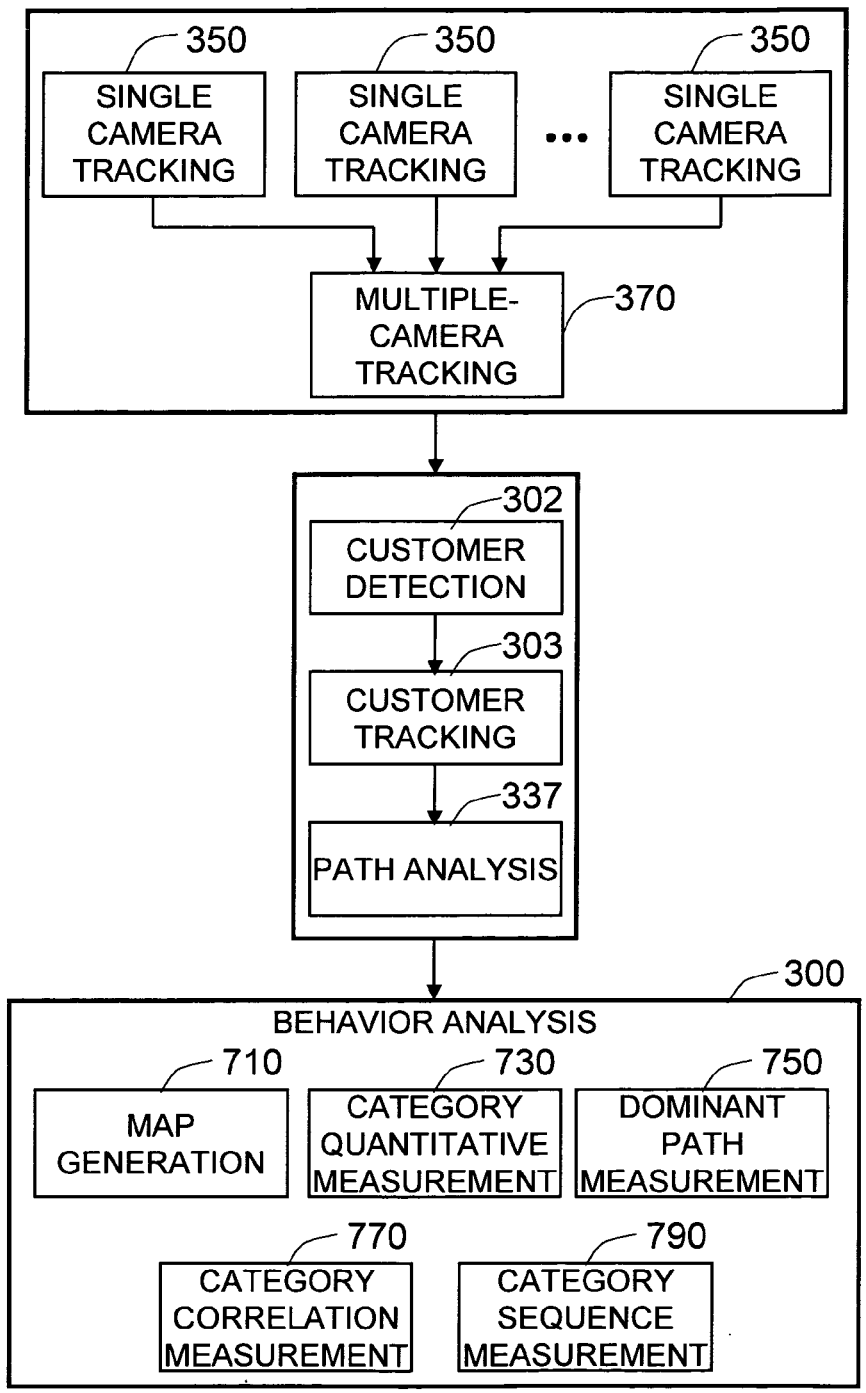
FIG. 6 shows an exemplary process of applying multi-camera tracking to single customer tracking and behavior analysis in a preferred embodiment of the invention in a retail store.

FIG. 6 shows an exemplary process of applying multi-camera tracking to single customer tracking and behavior analysis in a preferred embodiment of the invention in a retail store, using a plurality of means for capturing images 100.

In the exemplary embodiment, the present invention detects 302 and tracks 303 the customer in the video input images from a plurality of means for capturing images 100 utilizing multi-camera tracking methods as discussed with regard to FIG. 4 and FIG. 5. The present invention joins the trajectories of the customer tracks from a video of a means for capturing images 100 to another video of a means for capturing images 100 while the customer appears and disappears between the fields of view among a plurality of means for capturing images 100.

Based on the tracking information, the present invention analyzes 337 the path 330 of the particular customer, and the path analysis 337 can be used as one of the ways to process the behavior analysis 330 of the customer and obtain useful information about the customer behavior. The exemplary behavior analysis comprises map generation 710 as visualization of the behavior, quantitative category measurement 730, dominant path measurement 750, category correlation measurement 770, and category sequence measurement 790.

Figure 7:
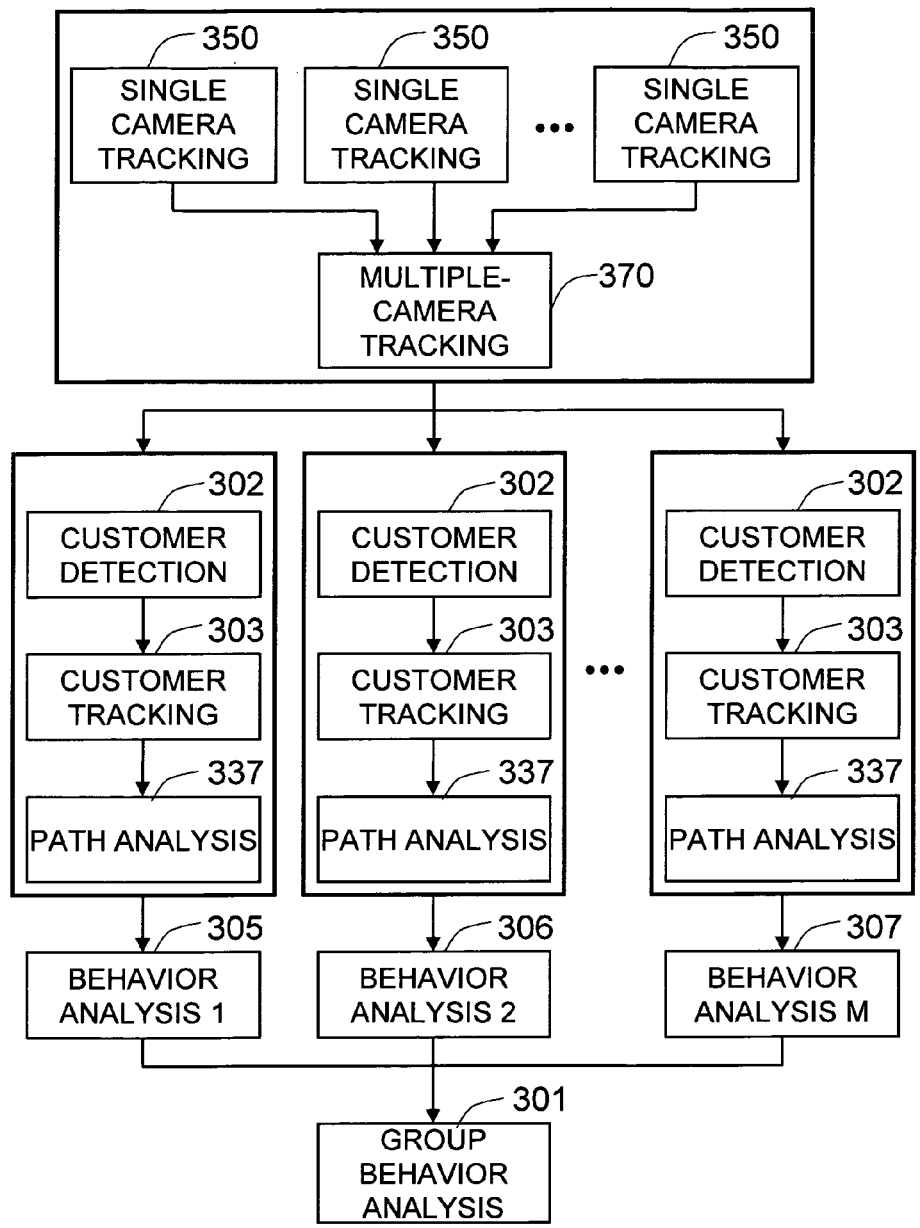
FIG. 7 shows an exemplary process of applying multi-camera tracking to the tracking and behavior analysis for a group of customers in a preferred embodiment of the invention in a retail store.

FIG. 7 shows an exemplary process of applying multi-camera tracking to the tracking and behavior analysis for a group of customers in a preferred embodiment of the invention in a retail store, with a plurality of means for capturing images 100.

In the exemplary embodiment, the present invention repeats the person tracking 360 for each customer that appears in the field of view of a plurality of means for capturing images 100. The present invention analyzes the group behavior by the aggregated behavior analyses, such as "behavior analysis 1" 305, "behavior analysis 2" 306, and "behavior analysis M" 307, based on the individual person tracking information. The group behavior analysis 301 can be decided by a set of predefined rules, such as a majority rule, in which the major characteristics among the aggregated individual behavior analyses represent the behavior for the entire group.

The present invention can also utilize more sophisticated rule application approaches than the simple rule application. For example, in the exemplary embodiment, the present invention can utilize a rule application module for processing the group behavior analysis.

The logic module enables dynamic rule application, where the group behavior analysis can be adjusted in a much easier and more structured way whenever there is a need for changes in the rules, which represent the group behavior analysis criteria, defined in the module, rather than relying on an ad hoc solution or static hard codes. An exemplary rule application module can be implemented utilizing the information unit verification technologies discussed in Jung 11/999,649.

Figure 8:
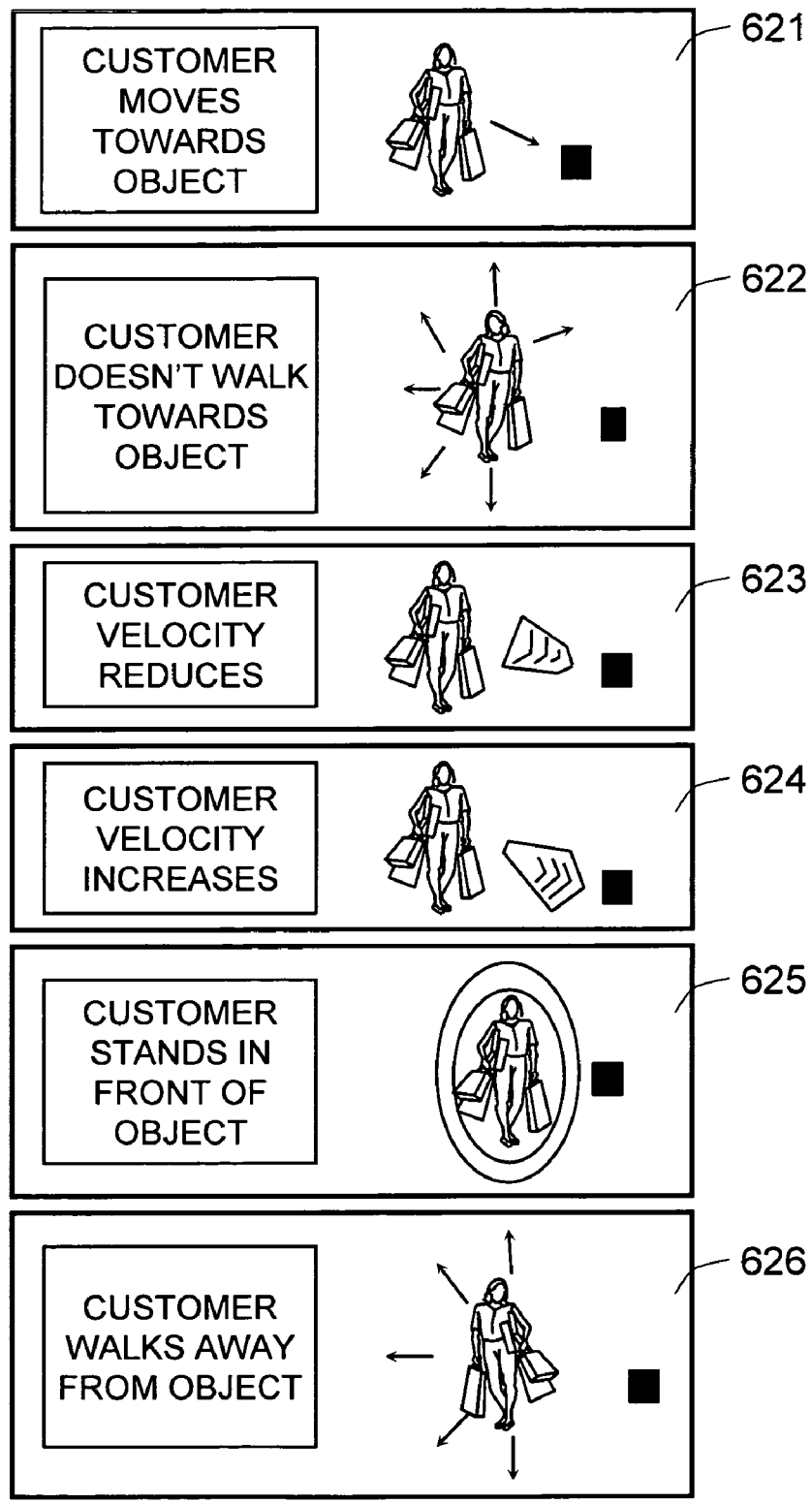
FIG. 8 shows exemplary spatio-temporal primitives for modeling human-object behavior in retail enterprises where a preferred embodiment of the invention is often installed as an exemplary method for a high level interpretation of customer behavior.

FIG. 8 shows exemplary spatio-temporal primitives for modeling human-object behavior in retail enterprises where a preferred embodiment of the invention is often installed, as an exemplary method for a high-level interpretation of customer behavior.

Behavior recognition can be achieved via spatio-temporal analysis of tracks using geometry and pattern recognition techniques. This is achieved by defining and detecting spatio-temporal relations specific to the retail enterprise domain followed by a Bayesian Belief propagation approach to modeling primitive behaviors specific to the retail domain.

In the exemplary embodiment shown in FIG. 8, the primitive behaviors can comprise categories of "customer moves toward object" 621, "customer doesn't walk toward object" 622, "customer velocity reduces" 623, "customer velocity increases" 624, "customer stands in front of object" 625, and "customer walks away from object" 626.

These primitive behaviors can then be combined to model predefined complex behaviors. This method is similar to two-stage behavior recognition systems where probabilistic inference is performed on high-level semantic notions, using variable length Hidden Markov Models (HMM), Bayesian nets, and stochastic grammar. Exemplary prior arts for the variable length Hidden Markov Models (HMM) can be found in A. Galata, et al., "Modelling Interaction Using Learnt Qualitative Spatio-Temporal Relations and Variable Length Markov Models," in European Conference on Artificial Intelligence, 2002, Lyon. Exemplary prior arts for the Bayesian nets can be found in H. Buxton, et al., "Advanced visual surveillance using Bayesian networks," in International Conference on Computer Vision, 1995, Cambridge, Mass., and S. G. Gong, et al., "Bayesian nets for mapping contextual knowledge to computational constraints," in British Machine Vision Conference, 1993, Guildford, England. Exemplary prior arts for the stochastic grammar can be found in Y. Ivanov, et al., "Recognition of Visual Activities and Interactions by Stochastic Parsing," IEEE Trans on Pattern Analysis and Machine Intelligence, 2000. 22(8): p. 852-872, and D. Moore, et al., "Recognizing Multitasked Activities using Stochastic Context-Free Grammar," in Workshop on Models versus Exemplars in Computer Vision held in Conjunction with IEEE CVPR 2001, 2001, Kauai, Hi.

This approach to detecting qualitative spatio-temporal relations for human-object relationships is based on methods developed by 1) A. Cohn, et al., "Towards an Architecture for CogniWe Vision Using Qualitative Spatial-Temporal Representations and Abduction," Spatial Cognition III, 2003; 2) J. Fernyhough, et al., "Event recognition using qualitative reasoning on automatically generated spatio-temporal models from visual input," in IJCAI 97 Workshop on Spatial and Temporal Reasoning, 1997, Nagoya; and 3) J. Fernyhough, et al., "Constructing Qualitative Event Models Automatically from Video Input, Image and Vision Computing," 2000(18): p. 81-103.

Fernyhough, et al. predefined the spatial relationships in terms of a set of proximity relationships and relative direction of motion relationships. FIG. 8 shows the exemplary spatio-temporal primitives, which an exemplary embodiment of present invention can use for modeling the relationships between human and object in retail enterprises. These spatio-temporal relations scene descriptors are invariant to the absolute position and direction of the interacting objects within a scene and encode relative spatio-temporal information. Motion history information from the tracking algorithm will be used to extract features and create a feature vector, which contains the relative spatial location and relative velocities with respect to the objects in the scene. These feature vectors will then be used to develop probabilistic models for recognizing the spatio-temporal relationships in a new video sequence. These spatio-temporal relations will then be combined using probabilistic networks to model the desired behavior.

Once models for desired customer behavior exist, customer behavior may then be analyzed. As a customer approaches a target object, the customer's previous behaviors will be analyzed, and this information will be used to influence the business decision with regard to the target object. For example, a customer that recently spent large amounts of time in the cosmetic section may be shown a cosmetic advertisement containing references to items on specific shelves where they had shopped.

In group situations, the behaviors of the individuals will be analyzed to determine whether those individuals have been traveling as a group within the store or are simply independent individuals arriving on the scene simultaneously. If the determination has been made that the individuals are traveling as a group, then their individual behaviors may be combined into a set of group-specific behaviors (group moves toward object, group velocity increases, etc.). A decision may then be made to tailor the target object to the group, rather than decide among separate individuals.

Exemplary attributes for analyzing a behavioral pattern based on visual information can be achieved from the shopping and walkthrough history of the customer or the group of customers 401, i.e. spatial information where the customer or the group of customers 401 has been in the path 330 through the store, using arrays of sensing devices, such as the means for capturing images 100.

In the present invention, another exemplary attribute of extracting the interest of the customer or the group of customers 401 can be processed by measuring the time spent in a certain area within the store.

In the present invention, the step and means for analyzing the path 330 of the customer or the group of customers 401 can further comprise the following attributes:
    a) temporal pattern,
    b) spatial preference pattern,
    c) frequency pattern,
    d) relational pattern, and
    e) special event pattern.

The exemplary temporal pattern attribute can be time spent in each section of the store or the time of day. The exemplary spatial preference pattern attribute can be path history or preference in a certain path vs. other paths. The exemplary frequency pattern attribute can be frequency of visiting certain sections multiple times or more times than other sections. The exemplary relational pattern attribute can be the relative effect of one path vs. another, the relative effect of a path 330 when there is interior decoration modification or stock-layout change, or the relationship between the path 330 and amenities in the store, such as a bathroom, diaper changing room, water fountain, telephone booth, and customer service. The exemplary special event pattern attribute can be a change in the path 330 due to the special event of the day.

In the exemplary embodiment, the present invention can also categorize the behavior of the customer or the group of customers 401 based on the exemplary spatial preference pattern attribute based on the history of each path 330. As such, when this categorization is useful according to the market needs of the owner of a particular system, different paths are analyzed and categorized in order to show the spatial preference pattern by the customers.

FIG. 9 through FIG. 20 discuss various types of behavior analyses in the present invention, which comprise:
    1) Map Generation: Display of qualitative visualization for store designer for overall shopping behavior,
    2) Quantitative Measurement per Category, such as a ratio between shopping interaction levels, e.g. level 2 over level 1, based on a category-level path analysis,
    3) Dominant Path Measurement, which implies a specific decision pattern because a finite number of next regions to choose from a "location A" defines the number of directions from that specific location and shows the tendency/preference of customers' decisions for the next path, 4) Category Correlation of shopping paths for optimal distance between categories, and
5) Category Sequence, which includes the order of engagement.

Figure 9:
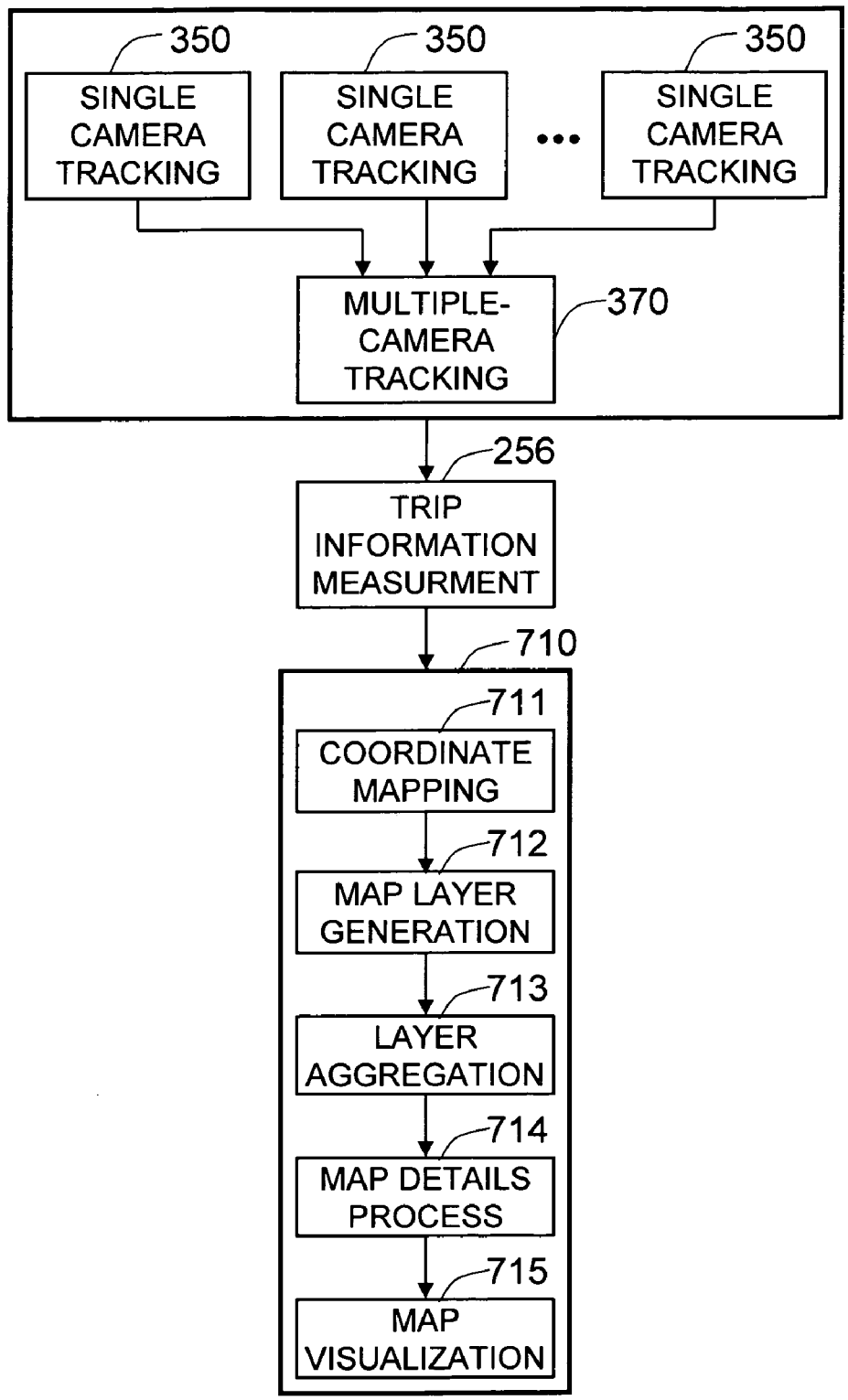
FIG. 9 shows exemplary processes for the map generation as a part of the behavior analysis based on the trip information measurement.

FIG. 9 shows exemplary processes for the map generation as a part of the behavior analysis based on the trip information measurement 256.

The trip information measurement 256 in the present invention based on the multiple camera tracking can produce various outputs. One piece of information that is calculated from the tracking is the coordinates of the people's movement, such as shopping paths. The coordinates can be mapped 711 to a layout of the physical space, such as a store layout. The x-axis, y-axis, and the unit on the axis that forms the grid on the xy plane can be decided based on the granularity of spatial resolution that depends on the goal of the decision maker who owns a particular embodiment of the present invention.

The connected sequence of mapped coordinates formulates a line on a layer. The present invention can create multiple layers during the map layer generation 712 stage, where each layer contains a type of information specifically intended for the layer. For example, one layer can be created for all of the paths of people who pass by a particular region of the physical space. Another layer can be created for the paths of people who interacted with target objects in a category. Further examples are discussed with regard to the extracted analytical and statistical data from the trip information above for FIG. 1.

The final map generation can comprise one or more layers. A map with a single layer can contain the single type of information that is measured for the particular layer, such as traffic count. The present invention can also aggregate 713 the layers that are selected for a complicated analysis to generate a combined-layer map, after generating multiple layers of information. The final generated map can be visualized 715 through a means for producing output after handling the map details 714, such as the legend information and the colors of the symbols on the map.

Figure 10:
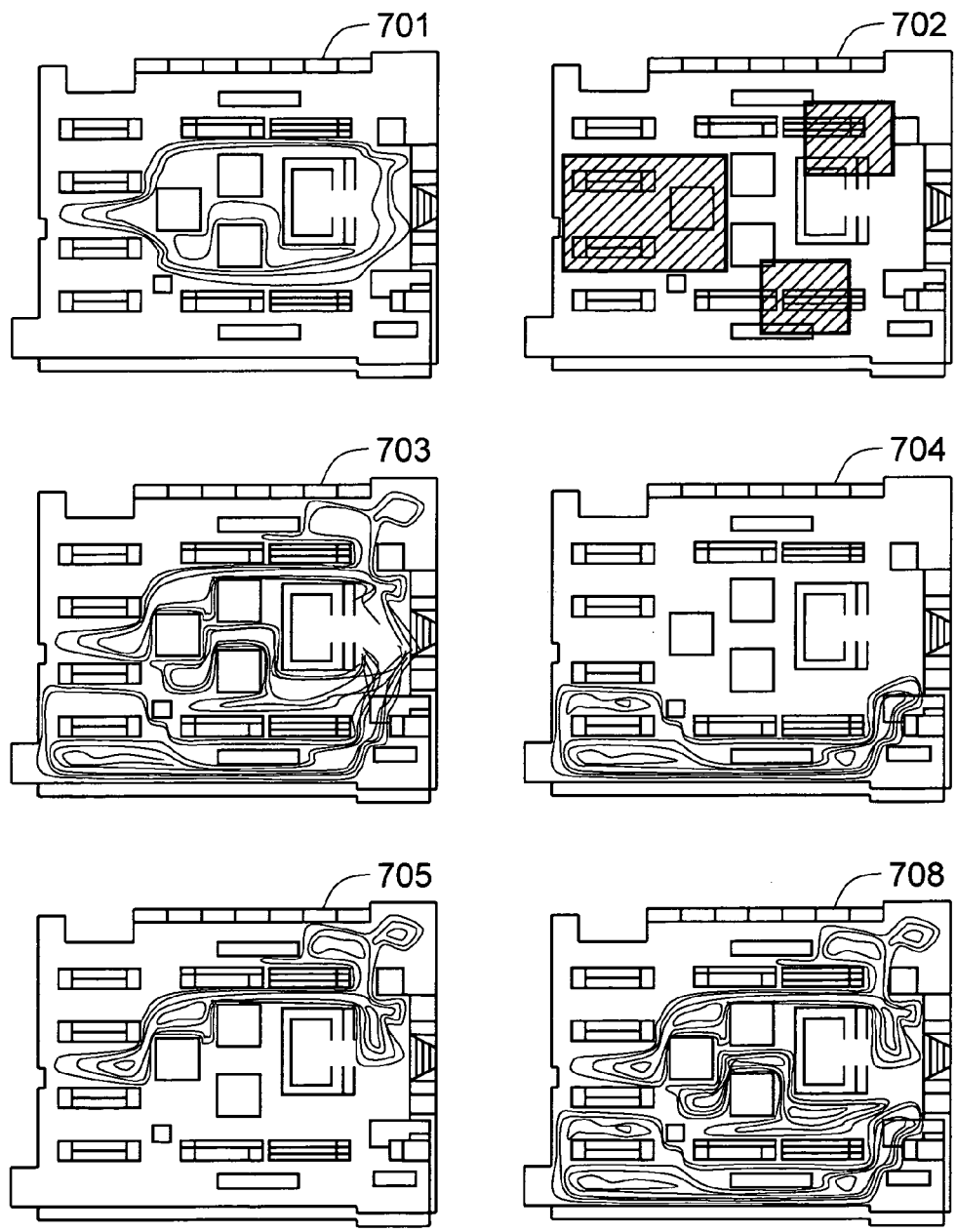
FIG. 10 shows exemplary plurality of layers that visualize exemplary analytical and statistical data that are measured from the trip information.

FIG. 10 shows exemplary plurality of layers, such as "layer 1" 701, "layer 2" 702, "layer 3" 703, "layer 4" 704, "layer N" 705, which visualize exemplary analytical and statistical data that are measured from the trip information. Thus, the exemplary analytical and statistical data in FIG. 1 can be transformed into the following layers:

a) a layer for the traffic distribution that shows penetration throughout the store,
b) a layer for the shopping distribution that shows activity throughout the store,
c) a layer for the shopping conversion that shows traffic converted to shopping,
d) a layer for the category-level traffic distribution,
e) a layer for the category-level shopping distribution, and
f) a layer for the category-level shopping conversion, The results of behavior analysis can also be transformed into the layers, which comprise:

a) a layer for the quantitative measurement per category based on the category-level path analysis,
b) a layer for the dominant path direction,
c) a layer for the category correlation analysis, and
d) a layer for the category sequence analysis.

Each data above can be represented in its own layer, and a plurality of the layers can be combined 708 to create a comprehensive map of behavior analysis for the combined analytical data.

Figure 11:
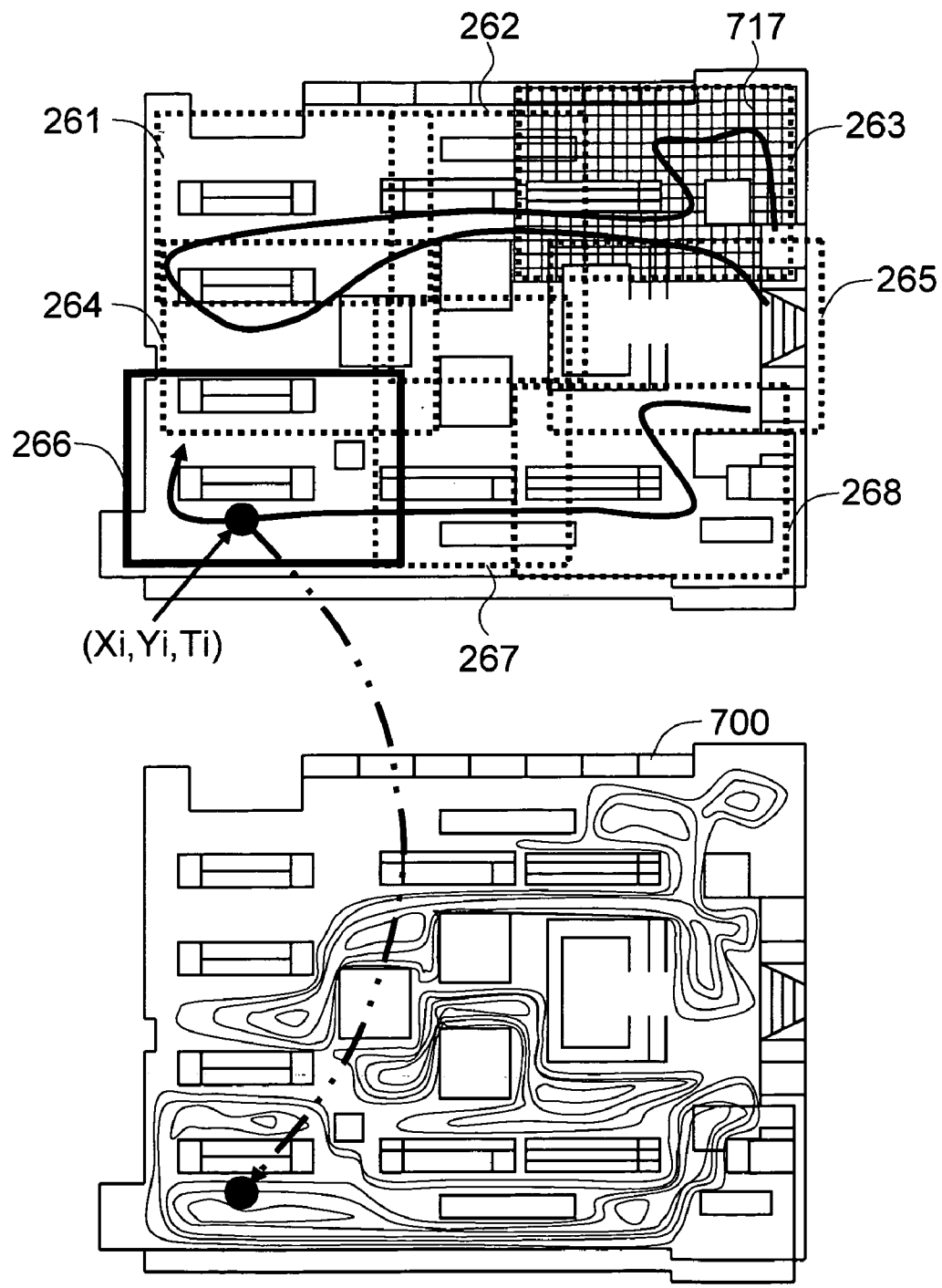
FIG. 11 shows details of an exemplary map generation based on the trip information in the present invention.

FIG. 11 shows details of an exemplary map generation based on the trip information in the present invention.

In the present invention, maps are a display of visualization for quantitative measurement for the behavior of customers in a physical space for an overall understanding of the behavior, such as shopping behavior.

There can be multiple layers in the final generated map 700, as discussed in FIG. 9. For example, a level 1 layer can represent level 1 interaction of people, where level 1 interaction can be defined as pass through the physical space, and a level 2 layer can represent level 2 interaction, where level 2 interaction can be defined as the exposure level of the people in the region. Likewise, other levels of interaction, such as engagement with an object in the physical space and purchase of a product, can also be defined and represented in the layers.

Exemplary layers that visualize the analytical and statistical data are also given above. A physical space can be divided into multiple categories, such as the "Category 1" 261, "Category 2" 262, "Category 3" 263, "Category 4" 264, "Category 5" 265, "Category 6" 266, "Category 7" 267, and "Category N" 268. The map can represent the category-level data per category in its own layer, also. The sequence of coordinates from the tracking information, such as $(x_i, y_i, t_i)$ where $(x_i, y_i)$ is the position of the person at time $t_i$, is translated and visualized in a symbol, such as a colored dot or segment in a line, in the final representation of the map 700.

The behavior analysis output in the maps can comprise a ratio, such as a ratio between a map for level 1 interaction and a map for level 2 interaction.

A grid element in a grid 717 in the map is decided by the granularity of spatial resolution, and it is per space based in the exemplary embodiment.

Figure 12:
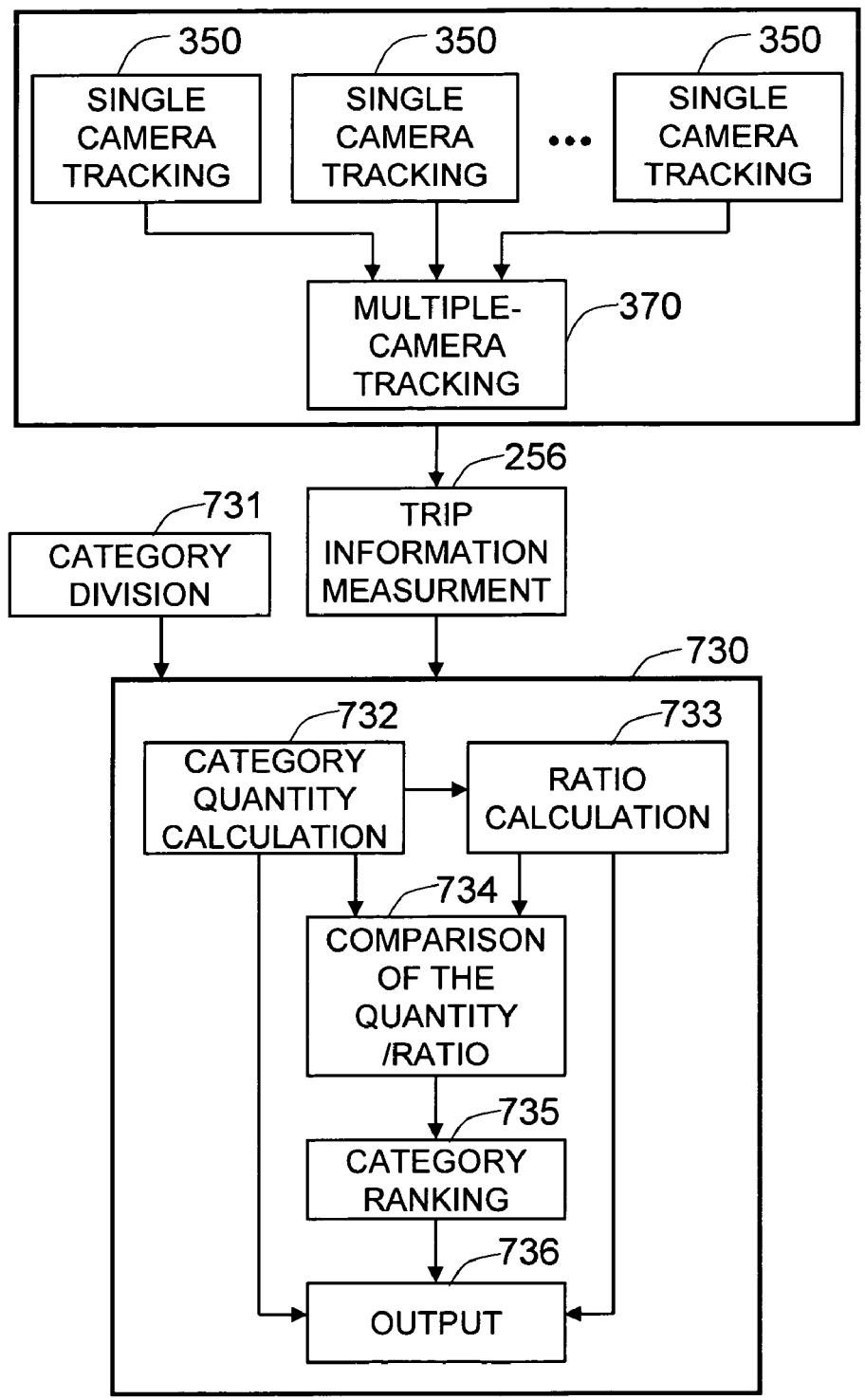
FIG. 12 shows exemplary processes for the quantitative measurement per category as a part of the behavior analysis based on the trip information measurement.

FIG. 12 shows exemplary processes for the quantitative measurement per category as a part of the behavior analysis based on the trip information measurement 256.

The trip information measurement 256 based on the multiple camera tracking is used to produce an output for quantitative measurement per category.

The term "category" is defined as a logical entity for a group of products, a group of product types, space, areas in a store, a display of a group of products, or a department with similar relevance in the present invention. The term "sub-category" is also similarly defined as a logical entity for a group of products, a group of product types, space, areas in a store, a display of a group of products, or a department with similar relevance, in regards to the "category" in the present invention.

The "category" can comprise a plurality of "sub-categories." The type or characteristics of the "sub-category" does not have to match with that of the "category", but the "sub-category" is defined in connection with the "category" in the present invention. A category is not necessarily a spatially adjacent single entity, which means a category can consist of multiple distributed physical spaces or detached components.

Figure 13:
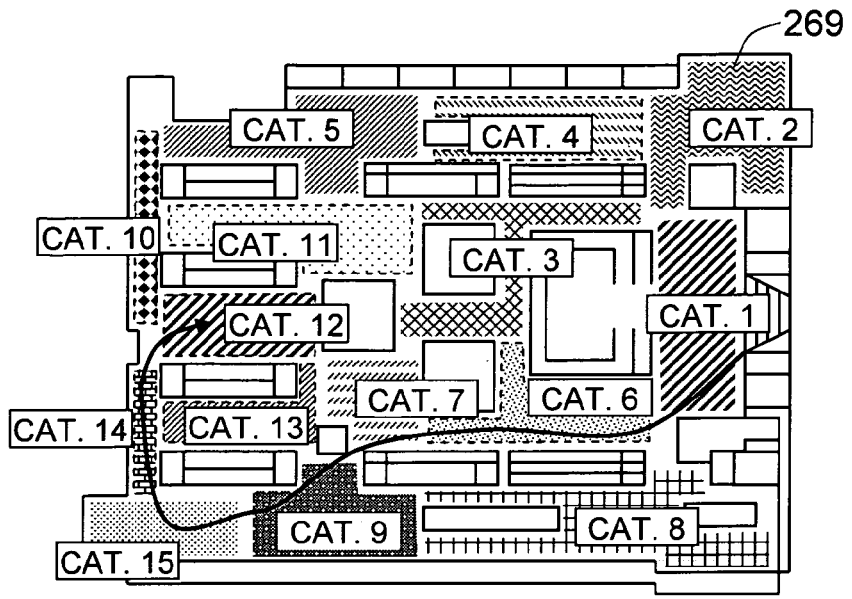
FIG. 13 shows an exemplary layout of a plurality of categories in a space and exemplary quantitative measurement per category in the present invention.

A physical space can be divided 731 into multiple categories. An exemplary categorization of a physical space is shown in FIG. 11 and FIG. 13. Based on the trip information measurement 256 per category, the present invention processes the category quantity measurement for each category.

Among the exemplary analytical and statistical data from the trip information above for FIG. 1 that are used to generate map layers, the category-level data, such as the category-level traffic distribution, category-level shopping distribution, and category-level shopping conversion, can be good exemplary quantities that are calculated 732 per category in this process.

The raw quantitative numbers per the types of information, such as the category-level traffic distribution and the category-level shopping distribution, can be produced as an output 736 for the category quantitative measurement.

However, the present invention can calculate the ratio 733 among the quantitative numbers. For example, a ratio of shopping over the traffic in each category, i.e. the category-level shopping conversion, can be calculated for all of the categories.

The present invention can further compare 734 the quantity and ratio among the categories, and rank 735 the categories according to their performance in a predefined order (such as an increasing or decreasing order).

FIG. 13 shows an exemplary layout of a plurality of categories 269 in a space and exemplary quantitative measurement per category in the present invention.

The category-level process includes numbers that are statistically aggregated data for the behavior analysis within the specific category. The measurement is performed for a specific region of a category rather than an entire physical space to which the category belongs. For example, category-level traffic can be counted compared to the traffic count for the entire space.

Exemplary behavior analysis output comprises a ratio between category levels, differences, and additions of the behavior analysis measurements per category.

The quantitative measurement table for a category 737 in FIG. 13 shows exemplary data measured for a group of categories, i.e. category 1 through category 15, in a physical space. The type 1 information in the first row of the table can represent the traffic count per category, the type 2 of information in the second row of the table can represent the engagement count per category, and the type 3 of information in the third row of the table can represent the purchase count per category. Based on the counts, the ratio 1 information in the fourth row of the table can calculate the ratio between the traffic count and engagement count per category as a percentage. Likewise, the ratio 2 information in the fifth row of the table can calculate the ratio between the engagement count and the purchase count per category as a percentage.

For example, for category 1, there are "2232" trips made by the people within the category: "953" of them were engaged with a target object in the category, and "57" of the engaged people actually made purchases. Based on the counts, the ratio between the traffic count and engagement count is calculated as 42.70%, and the ratio between the engagement count and the purchase count is calculated as 5.98%. The ratios for other categories are similarly calculated.

In a comparison analysis between category 1 and category 4 in this exemplary embodiment, the analysis shows that although the conversion ratio from the traffic count to the engagement count for category 1 is greater than that of category 4, i.e. 42.70% vs. 24.14%, respectively, the conversion ratio from the engagement count to the purchase count is actually greater for category 4 than category 1, or 66.04% vs. 5.98%, respectively.

FIG. 14 shows an exemplary behavior measurement for an exemplary category based on the customers' interactions with sub-categories in the category during different windows of time through a plurality of exemplary tables for behavior measurement.

In the exemplary tables in FIG. 14, the "Table for Behavior Measurement 1" 308 and the "Table for Behavior Measurement 2" 309 are exemplary behavior measurements for an exemplary category, such as Category A, during different windows of time, from W1 (T1~Tn) to Wp (T1~Tn). Each row in the exemplary tables shows a string of behavior measurement for a customer during the window of time.

In the exemplary tables in FIG. 14, the number of customers per table can be various, and a customer in one table does not necessarily mean the same customer as in another table just because both of them are designated by the same ID. Therefore, customer 1 in the "Table for Behavior Measurement 1" 308 and customer 1 in the "Table for Behavior Measurement 2" 309 are not necessarily the same customer.

In addition, the starting time, ending time, and length of the string of behavior measurement for each of the multiple customers during a window of time can be various because the customers appear and disappear in the field of view of the means for capturing images at a category in different patterns.

In the exemplary tables, each element in the string of behavior measurement for a customer during a window of time can be a 3-tuple, consisting of a sub-category number, interaction level, and information with regard to the interaction with the target objects in the sub-category.

For example, the string of behavior measurement for customer 1 in the "Table for Behavior Measurement 1" 308 consists of (C1,PB,P1), (C2,PB,P2), (C3,L2,P3), . . . , (C4, PB,P4), where C1, C2, C3, and C4 mean sub-category numbers, PB means passing-by interaction, L2 means level 2 interaction, and P1, P2, P3, and P4 mean target object numbers with which the corresponding sub-category in the 3-tuple are associated.

In another exemplary row, the string of behavior measurement for customer 2 in the "Table for Behavior Measurement 1" 308 consists of (C1,PB,P1), (C3,L2,P3), (C2,PB,P2), . . . , (C4,PB,P4), (C5,L3,P5), where C1, C2, C3, C4, and C5 mean sub-category numbers, PB means passing-by interaction, L2 means level 2 interaction, L3 means level 3 interaction, and P1, P2, P3, P4, and P5 mean target object numbers with which the corresponding sub-categories in the 3-tuple are associated, respectively. Therefore, the second 3-tuple element (C3, L2,P3) in the string means that customer 2 was in sub-category 3, and the customer's behavior was measured as level 2 interaction, while the customer interacted with the target object number 3 in sub-category 3, within the window of time W1.

Based on the plurality of exemplary tables for behavior measurement and accumulated statistics for the customer behavioral patterns, various behavior analyses are possible.

In another exemplary behavior analysis, the present invention can calculate the percentage of visits per each sub-category compared to all of the visits to sub-categories after the customer approached a predefined object in the category, such as 10% for sub-category 1, 11% for sub-category 2, and so on, after the customer approached the predefined object in the category during the window of time W1. In this example, the order of visits is not taken into consideration.

However, in another exemplary behavior analysis, the present invention can also calculate the percentage of visits for the sub-categories that were the customer's first visit in the category, right after the customer approached the predefined object in the category. For example, 30% of the customers first visited sub-category 1 right after approaching the predefined object in the category, 20% of the customers first visited sub-category 2 right after approaching the predefined object in the category, and so on. Likewise, the present invention can also calculate the last sub-category visit statistics, right before the customers approached the predefined object in the category.

In addition to these analyses for the sequence and ordering of the sub-categories, in another exemplary behavior analysis, the present invention can also calculate the correlation among the sub-categories. For example, the present invention can count the number of n-tuple sub-categories the customer visited before or after approaching the predefined object in the category, such as the number of visits for the 2-tuple sub-categories, [(C1,PB,P1), (C2,PB,P2),], [(C1,PB,P1), (C3,PB,P3),], [(C1,PB,P1), (C4,PB,P4),], [(C2,PB,P2), (C3, PB,P3),], [(C2,PB,P2), (C4,PB,P4),], and [(C3,PB,P3), (C4, PB,P4),]. In this measurement, the value of n in the n-tuple and the total number of sub-categories, denoted as $N_{tc}$, can be decided by the decision maker in a particular physical space. For example, the total number of sub-categories, $N_{tc}$, can be decided based on the available number of adjacent sub-categories from a category. Then the number of ways of grouping the un-ordered n-tuples among the total number of sub-categories, Ntc, becomes a process for calculating a binomial coefficient, which is:

$$Num_{max}(\text{grouping un-ordered } n\text{-tuples}) = C_n^{Ntc} = \binom{N_{tc}}{n} \quad (1)$$

where n is the number of elements in the n-tuple and $N_{tc}$ is the total number of sub-categories.

In another exemplary behavior analysis, the present invention can also calculate the dominant direction that the customer took after visiting a certain sub-category, based on the statistics. For example, if the percentage of [(C1,PB,P1), (C2,PB,P2),] is 60%, [(C1,PB,P1), (C3,PB,P3),] is 30%, and [(C1,PB,P1), (C4,PB,P4),] is 10%, we can learn a behavioral tendency in which more customers prefer the path toward sub-category 2 rather than paths toward sub-categories 3 or 4, after visiting sub-category 1.

Temporal Measures such as Dwell Time and Frequency

In-store activities can be tailored based on the length of time a customer spends in a given sub-category. Using this data, market research and retail store plans can be correlated to the perceived activity of the customer, based on the customer's dwell time in a particular sub-category.

The behavioral analysis can also comprise information for multiple visits to a specific sub-category by the same customer. This frequency pattern might trigger a series of related but progressively engaging or informing market activities. For example, the frequency in the trip information can steadily build awareness of a given target object and increase the probability of purchase for a particular target object.

Figure 15:
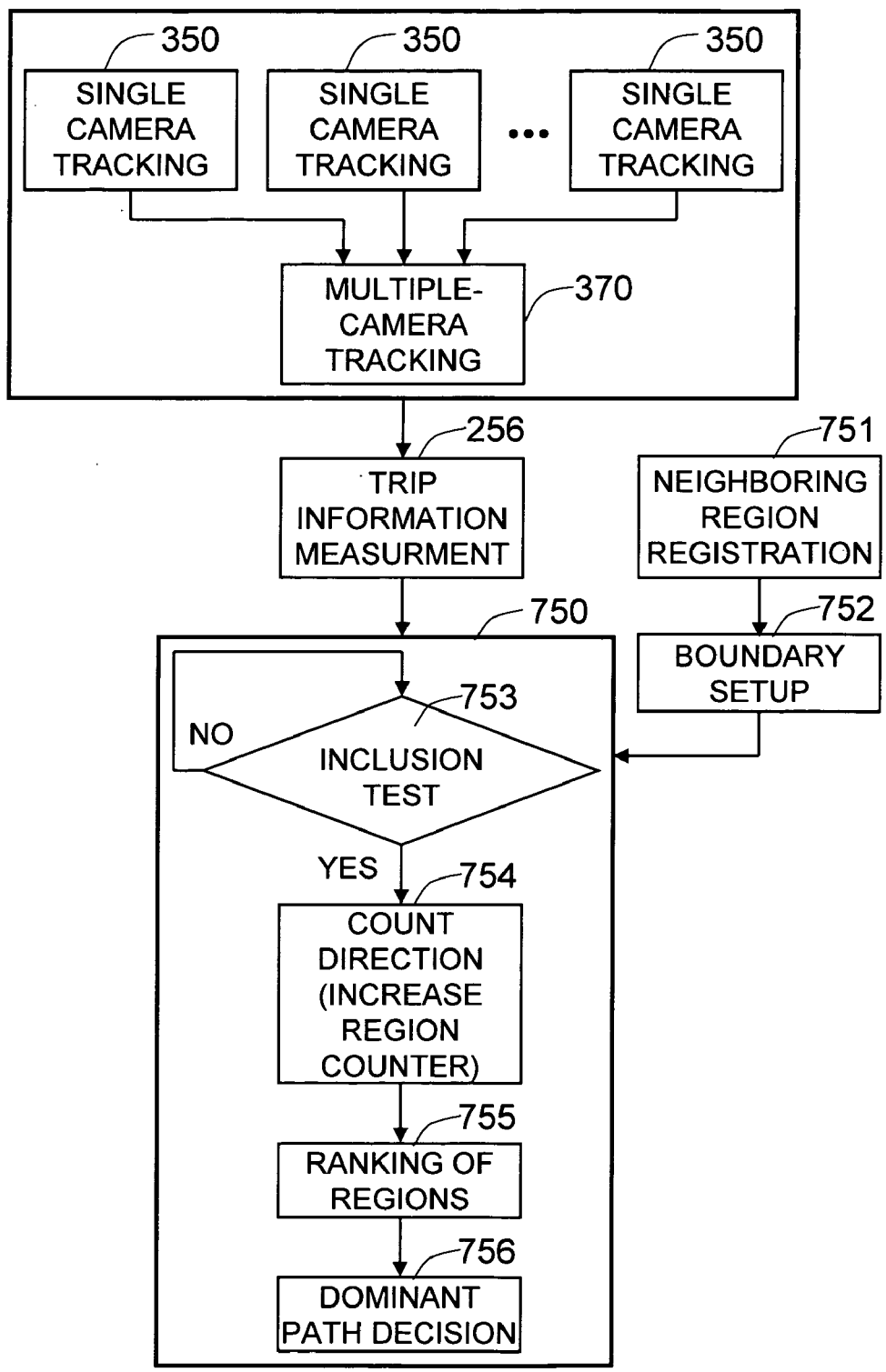
FIG. 15 shows exemplary processes for the dominant path measurement as a part of the behavior analysis based on the trip information measurement.

FIG. 15 shows exemplary processes for the dominant path measurement as a part of the behavior analysis based on the trip information measurement 256.

In the exemplary embodiment, the present invention identifies and registers 751 the neighboring regions from the target location that are measured for the dominant path 750. The boundary of each neighboring region can be defined 752 with a set of coordinates. A simplest boundary of the neighboring region can be defined with a rectangular bounding box that can be represented with a pair of (x,y) coordinates, although the boundary does not have to be a rectangle. The next region for the path direction can also be defined as either point-level or polygon-level, depending on the predefined granularity of the next region.

Then, the trip information measurement 256 based on the multiple camera tracking is used to count the number of trips that are selected for the next neighboring regions from a measured region.

One exemplary method of deciding whether a next neighboring region is or is not selected is to test 753 whether a series of coordinates from the trip information is included within the boundary of the next neighboring region for longer than a predefined period of time. It can be defined as follows:

$$T_{Ri}(C1\sim Cn) \geq Th_{Ri} \quad (2)$$

where $T_{Ri}(C1\sim Cn)$ is the elapsed time for a series of coordinates, from C1 to Cn, at a region Ri, and $Th_{Ri}$ is a predefined time threshold to test the inclusion of the coordinates within a boundary of the region Ri.

If the series of coordinates from the trip information satisfies the predefined time threshold, the counter for the selected neighboring region can be incremented 754 to represent that the direction toward the region has been chosen by the particular trip during the time of $T_{Ri}(C1\sim Cn)$.

After accumulating the inclusions of trips among the neighboring regions for over a period of total dominant path measurement time, the present invention can rank 755 the regions according to the frequency and make a decision 756 for a dominant path.

Figure 16:
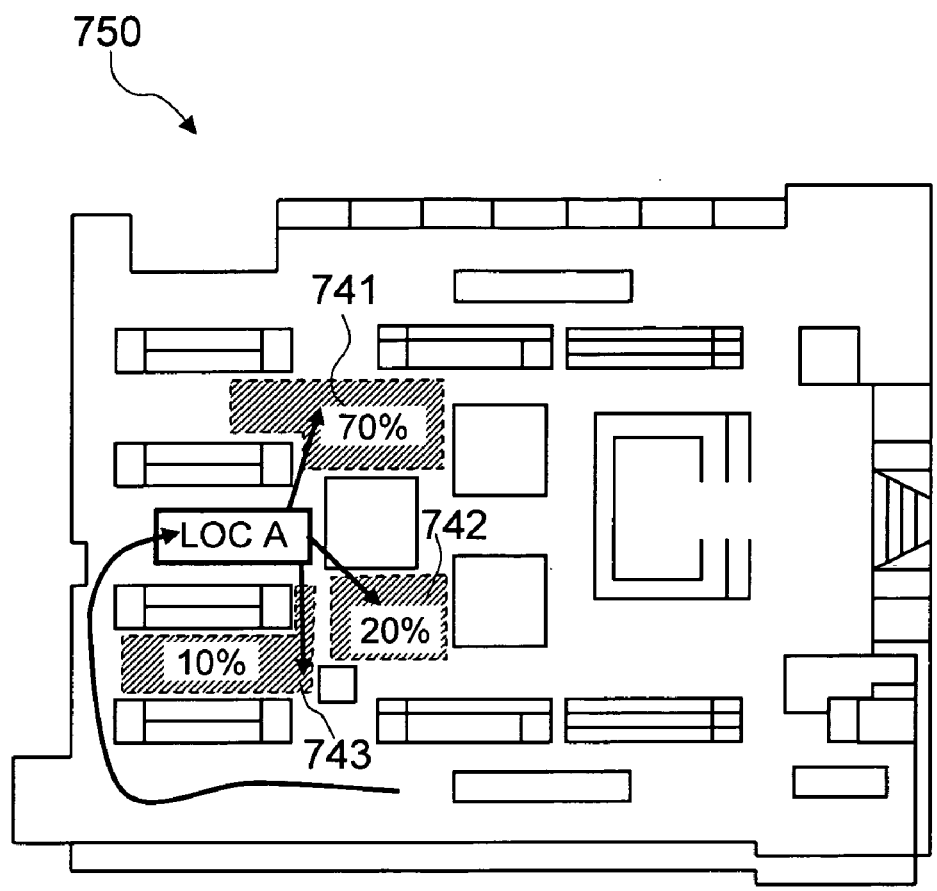
FIG. 16 shows an exemplary dominant path measurement in the present invention.

FIG. 16 shows an exemplary dominant path measurement 750 in the present invention.

For a particular path of a person in a given physical space, there exists a finite number of next regions, such as "neighboring region 1" 741, "neighboring region 2" 742, and "neighboring region N" 743, to choose from a location, such as "location A" in FIG. 16, when the person passes by the location at a time, "Ti". The number of next regions also defines the number of next available directions from that specific location. By measuring the frequency of the next regions that are chosen by the people from "location A" over a predefined period of time, the present invention can gather the statistical information about the dominant path in relation to the specific "location A".

The dominant path measurement can further indicate a specific decision pattern of the people in relation to the location. For example, a higher frequency for a direction from "location A" to "location B" than a frequency for another direction from "location A" to "location C" may indicate a decision pattern by the people for a product located in "location B" as compared to other products located in "location C." In the example shown in FIG. 16, the frequency percentage of "neighboring region 1" 741 is highest among the neighboring regions, which indicates that the path to "neighboring region 1" 741 is dominant and more people make a decision to move toward the region. In a retail store environment, the direction of travel past a target object, such as a particular product or display, can be used as the basis of a predicted shopping pattern of a customer.

In this measurement, the next direction and region can be defined based on the 1) point, or 2) region/polygon level, depending on the granularity defined by the owner of a particular embodiment of the present invention.

Figure 17:
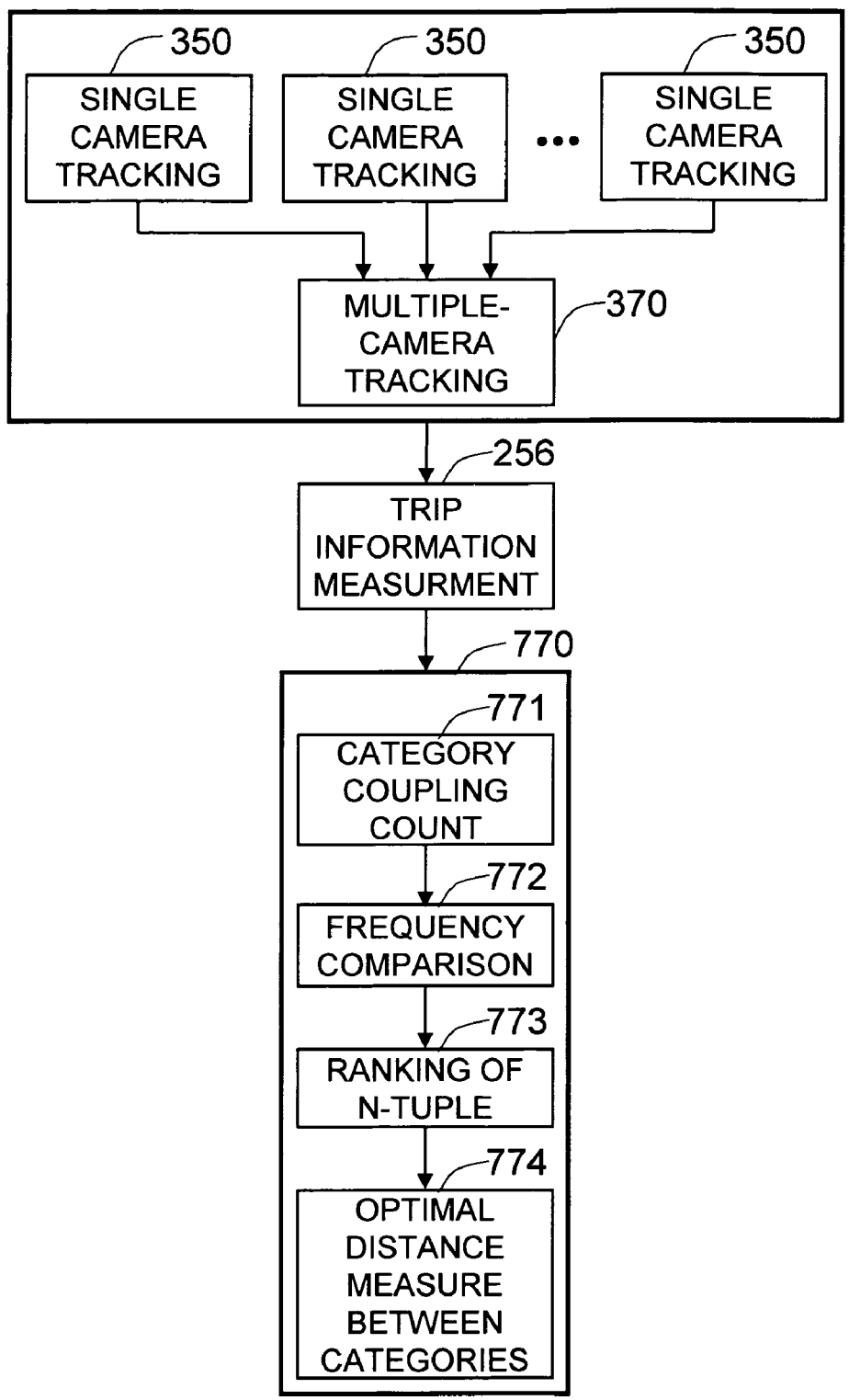
FIG. 17 shows exemplary processes for the category correlation measurement as a part of the behavior analysis based on the trip information measurement.

FIG. 17 shows exemplary processes for the category correlation measurement 770 as a part of the behavior analysis based on the trip information measurement 256.

The trip information measurement 256 based on the multiple camera tracking is used to measure the category correlation. One exemplary category correlation measurement is to count 771 the number of appearances for a group of categories.

In this measurement, the present invention measures the percentage of people who multiple categories and which multiple categories they shop, by grouping or coupling the categories, such as un-ordered 2-tuples categories or higher dimensional grouping of the categories, to which they made trips. The outcome of the measurement indicates a correlation among the categories. For example, the measurement calculates which categories appear together in the combination of the trips.

The accumulated appearance counts per a group of categories are compared 772 among the groups of categories, and the n-tuples are ranked 773 according to the frequency. The ranking shows which group of categories is most correlated among the other groups of categories. The correlation measurement can be used to calculate optimal distances between categories 774.

FIG. 18 shows exemplary data measured in the process for the category correlation measurement in the present invention.

The exemplary table for the count of the correlated categories 761 shows counts for a 2-tuples of the categories, i.e. the trips that are made from a category to another category in the 2-tuples are counted. For example, the first data row in the table for the count of the correlated categories 761 shows that there were 15 trip counts from category 1 to category 2, 45 counts from category 1 to category 3, 56 trip counts from category 1 to category 4, and 21 trip counts from category 1 to category 5, during a measurement window of a time period, e.g. Wi(Ti~Ti+n).

The total number of traffic counts was "839" during the window of time, and the percentage of each count is calculated as shown in the table for the percentage of the occurrence of the correlated categories 762. The categories in the 2-tuples are un-ordered in the category correlation measurement. Therefore, each percentage calculation for a pair of the categories can be added to represent the final percentage of the occurrence for each 2-tuple. For example, the table for the ranking of the category correlation 763 based on the frequency of occurrence shows that the category tuple (category 1, category 3) has the largest combined percentage of 16.69% for the occurrence of both of the categories in the trips during the measured window of time, among all possible combinations of the pairs of categories.

The coupling of categories can be extended to multidimensional grouping, i.e. a 3 or more dimensional grouping, which results in 3-tuples and n-tuples of un-ordered categories.

One objective of the measurement is to calculate the optimal distance between categories. The present invention can create an adjacency table and map based on the correlated categories.

Figure 19:
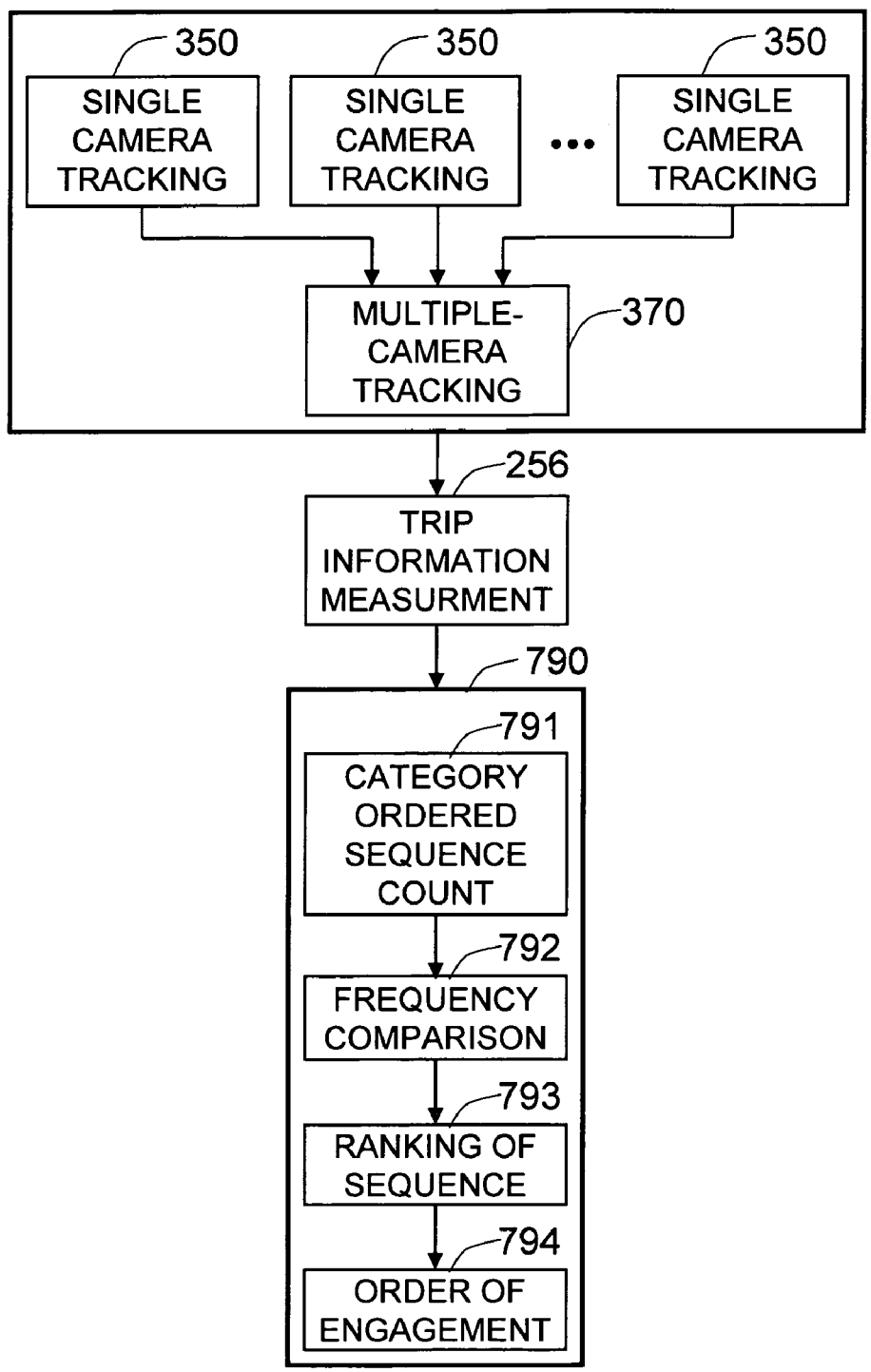
FIG. 19 shows exemplary processes for the category sequence measurement as a part of the behavior analysis based on the trip information measurement.

FIG. 19 shows exemplary processes for the category sequence measurement 790 as a part of the behavior analysis based on the trip information measurement 256.

While the category correlation measurement is related to the grouping of the categories that are correlated in the trips as discussed above, the category correlation measurement is not concerned with the ordering of the categories.

However, in the category sequence measurement, one objective of the present invention is to analyze the sequence among the categories within the trip of people by counting the sequence of trips from a category to another category 791.

Accumulation of the category sequences eventually provides a ranking 793 of the categories by comparing the frequencies of sequence 792, based on the preference of the people's trip movement. In a more complicated analysis, the present invention can also analyze the order of engagement 794 with the categories or target objects in the categories in addition to the trip order.

Figure 20:
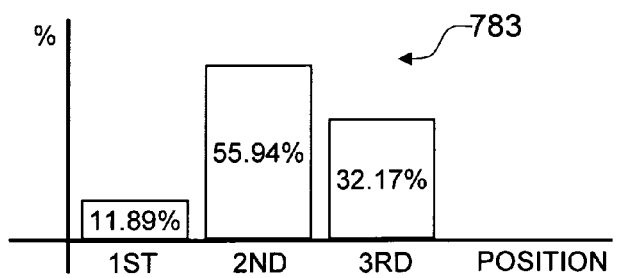
FIG. 20 shows exemplary data measured in the process for the category sequence measurement in the present invention.

FIG. 20 shows exemplary data measured in the process for the category sequence measurement among the plurality of categories in the present invention.

In a retail store application, the sequencing pattern can be one of the behavioral attributes that the trip information can comprise for the particular retail store environment. With regard to this data, the trip information comprises:

the areas of the store a customer has shopped most recently, the areas the customer is most likely to shop next, and a relevant combination of previously shopped areas.

This sequencing can be used to provide information for a product that has already been viewed or to reference a product that is likely to be viewed in the near future based on the customer's behavior—thus improving the probability of purchase for the product in a retail store.

The table for category sequence 781 is an exemplary embodiment of a table, which measures sequence relationship among a plurality of categories. For example, the first row of the table shows that there were 394 customers who visited category 2 after visiting category 1, 514 customers who visited category 3 after visiting category 1, and 130 customers who visited category 4 after visiting category 1. The two-dimensional arrays of values in the table for category sequence 781 show the measured counts for the adjacent categories that the customers immediately visited right after visiting a category in the leftmost column of the table.

However, the length of the category sequences can be extended further. For example, in another exemplary embodiment of the table for category sequence, the table can measure three sequences of categories or higher order sequences of categories that the customers visited one by one, using three-dimensional or higher-dimensional arrays of values.

The exemplary table for sequence statistics 782 shows the counts for the positions of categories that appear in the sequences with regard to a measured target category or pivot category, such as a "pivot category A" in a 4-dimensional measurement.

An exemplary sequence for the appearance of "category 1" in "position 1" may appear in a 4-tuple like ["pivot category A", "category 1", (another category), (another category)]. Similarly, the appearance of "category 1" in "position 2" may appear as ["pivot category A", (another category), "category 1", (another category)] and the appearance of the "category 1" in the "position 3" may appear as ["pivot category A", (another category), (another category), "category 1"].

The statistics can be calculated for the sequences before visiting the measured pivot category, so that the exemplary sequence tuples may appear as, ["category 1", (another category), (another category), "pivot category A"], [(another category), "category 1", (another category), "pivot category A"], and [(another category), (another category), "category 1", "pivot category A"]. Similarly the tuples can be formulated for other categories, i.e. "category 2" through "category N" in the example.

One of the ways to analyze the data is to compare the counts for each position and rank them.

For example, the first data row says that "category 1" appeared in "position 1" on 51 occasions, "category 2" did not appear in "position 1", "category 3" appeared in "position 1" on 712 occasions, and so on. By comparing and ranking the counts, the present invention can determine which category is the most visited at "position 1" after the people visit the pivot category.

Another way to analyze the data is to calculate the frequencies per category.

For example, the first data column says that "category 1" appeared in "position 1" on 51 occasions, in "position 2" on 240 occasions, and in "position 3" on 138 occasions in the collected sequences after visiting a measured pivot category, i.e. "pivot category A" in this example.

These counts can be used to calculate the percentage of each position in sequences per category with respect to the pivot category. For example, the graph 783 shows the percentage for the position of "category 1" in the sequence with respect to "pivot category A". The graph shows that the people visited "category 1" as the second stop 55.94% in the sequence if the people visited "category 1" in sequences, with respect to "pivot category A".

Figure 21:
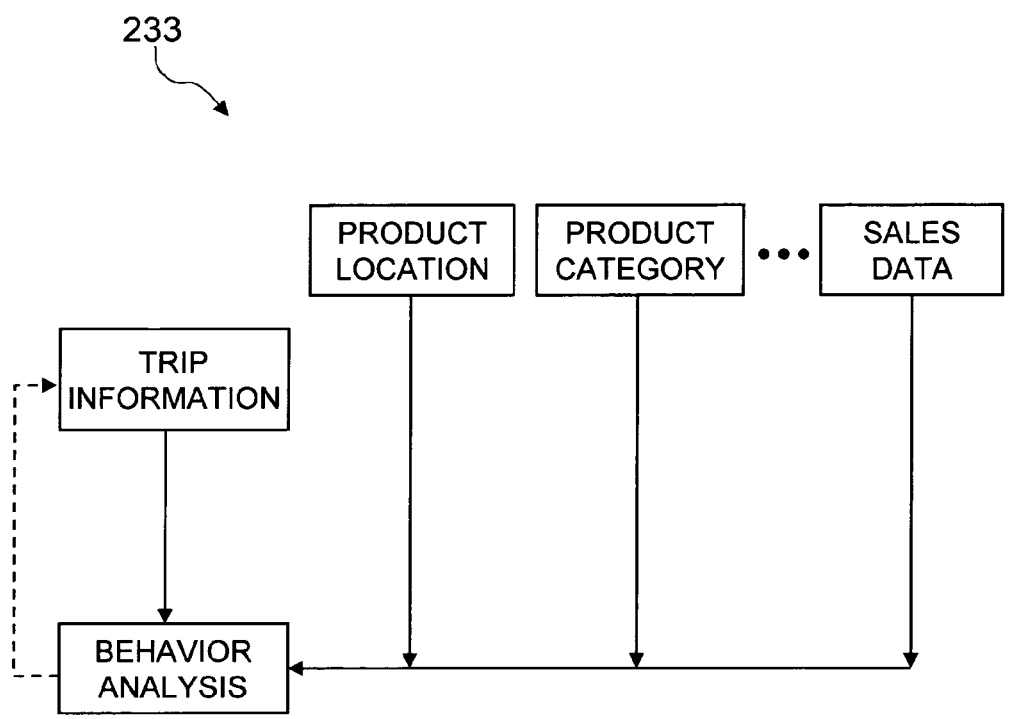
FIG. 21 shows an exemplary process for utilization of other inputs in the present invention.

FIG. 21 shows an exemplary process for utilization of other inputs in the present invention.

The behavior analysis in the present invention is performed primarily based on the automatic trip information measurement 256. However, the present invention can also utilize other inputs 233 for the behavior analysis in another exemplary embodiment. The other inputs can comprise:
  map information,
  sales data, sales data map, or product sales,
  category or layout of category,
  location of product,
  nearby behavior, and
  same product in multiple places.

The present invention can augment the trip information by domain-specific knowledge. Application of the domain-specific knowledge comprises:
  a) a step of adding behavioral attributes, calculated by the analysis of the tracking of the person, to the trip information, and
  b) a step of removing irrelevant data from the trip information.

Figure 22:
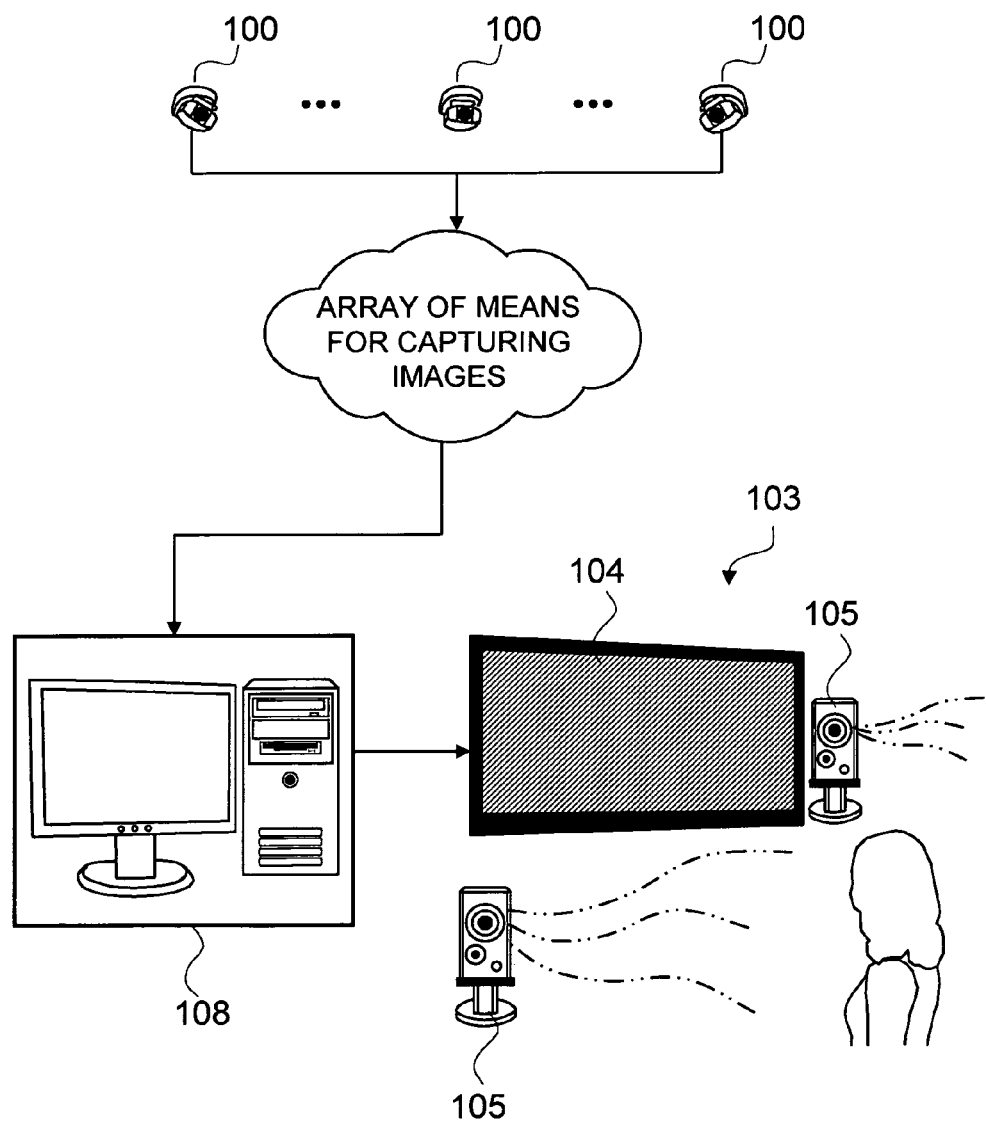
FIG. 22 shows an exemplary hardware configuration in a preferred embodiment of the invention.

FIG. 22 shows an exemplary hardware configuration in a preferred embodiment of the invention. In the exemplary embodiment shown in FIG. 22, the hardware embodiment and the software embodiment can be constructed as follows.

Exemplary Hardware Embodiment of the Present Invention

The exemplary hardware embodiment for the present invention can comprise a plurality of means for capturing images 100 with various focal lengths and charge-coupled device (CCD) sizes. In the exemplary embodiment, an exemplary means for capturing images 100 can comprise a camera. The plurality of means for capturing images 100 can be powered via 18-gauge power cable connected to a standard power supply box, and connected to a means for control and processing 108 via RG59 coaxial cable. The means for control and processing 108 can be an Intel P4 2.4 Ghz PC machine with 512 MB SDRAM memory, with an 80 GB hard disk. An iTuner Spectra frame grabber card can be installed in the PCI slot, and connected to the RG59 coaxial cables coming from each of the plurality of means for capturing images 100. The output of the processed information in the means for control and processing 108 can be sent to a means for playing output 103, which can comprise means for displaying output 104 and means for playing audio output 105, such as a speaker system.

Exemplary Software Embodiment of the Present Invention

The exemplary software embodiment of the present invention can consist of three main software packages:

1) Vision application: The vision application performs all of the low-level vision algorithms on each video stream. The individual track outputs from each video stream are generated by this application on each of the available plurality of means for control and processing 108.

2) Remote server: This application resides on each of the remote plurality of means for control and processing 108 that are connected to a plurality of means for capturing images 100 in a physical space, such as a retail store. The remote server is responsible for controlling and monitoring the vision application, and communicating with other remote servers and the main server.

3) Main server: The main server is responsible for coordinating the actions of all of the remote servers at a particular site. The main server will send the relevant instructions to each of the remote servers, instruct them to begin processing, and receive all of their data. The joining of tracks and the final level of output are produced at the main server. The behavior analysis processes can be performed in the remote servers or the main server utilizing the trip information.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for automatically analyzing the behavior of at least a person in a physical space based on measurement of the trip of the person, comprising the following steps of:
  a) capturing a plurality of input images of the person by a plurality of means for capturing images,
  b) processing the plurality of input images in order to track the person in each field of view of the plurality of means for capturing images,
  c) finding information for the trip of the person in the physical space based on the processed results from the plurality of tracks, and
  d) analyzing the behavior of the person based on the trip information,
wherein the trip information comprises coordinates of positions and temporal attributes of the plurality of tracks for the person.

2. The method according to claim 1, wherein the method further comprises steps of:
  a) repeating steps a) through d) in claim 1 for each person in a plurality of persons, and
  b) measuring the behavior of the plurality of persons by aggregating the trip information for each person.

3. The method according to claim 1, wherein the method further comprises a step of extracting statistical data from the trip information,
wherein the data comprises a traffic distribution, a shopping distribution, a shopping conversion, a category-level traffic distribution, a category-level shopping distribution, and a category-level shopping conversion.

4. The method according to claim 3, wherein the method further comprises a step of generating layers of information based on the statistical data,
wherein the layers comprise a layer for traffic distribution, a layer for shopping distribution, a layer for shopping conversion, a layer for category-level traffic distribution, a layer for category-level shopping distribution, and a layer for category-level shopping conversion.

5. The method according to claim 4, wherein the method further comprises a step of generating a map utilizing at least one layer from the layers of information,
wherein a combination of the layers can generate a map that represents complex behavior analyses.

6. The method according to claim 3, wherein the method further comprises a step of generating a map based on the extracted statistical data,
whereby the map comprises a traffic distribution map, a shopping distribution map, a shopping conversion map, a category-level traffic distribution map, a category-level shopping distribution map, and a category-level shopping conversion map.

7. The method according to claim 3, wherein the method further comprises a step of processing the behavior analysis based on the statistical data,
wherein the behavior analysis comprises map generation, quantitative category measurement, dominant path measurement, category correlation measurement, and category sequence measurement.

8. The method according to claim 7, wherein the method further comprises a step of processing a category-level path analysis for the quantitative category measurement.

9. The method according to claim 7, wherein the method further comprises a step of calculating a decision pattern of the person based on the dominant path measurement, whereby neighboring regions for the path direction can be defined either at point-level or at polygon-level depending on the predefined granularity of the neighboring region.

10. The method according to claim 7, wherein the method further comprises a step of calculating an optimal distance between categories based on the category correlation measurement.

11. The method according to claim 7, wherein the method further comprises a step of calculating the order of categories based on the category sequence measurement, whereby the order of categories shows the order of a customer's shopping engagement.

12. The method according to claim 1, wherein the method further comprises a step of analyzing the stopping power based on the temporal attributes,
whereby the temporal attributes comprise trip time and trip length.

13. The method according to claim 1, wherein the method further comprises a step of augmenting the trip information by domain-specific knowledge,
whereby the step of applying the domain-specific knowledge comprises:
 a) a step of adding behavioral attributes, calculated by the analysis of the tracking of the person, to the trip information, and
 b) a step of removing irrelevant data from the trip information.

14. The method according to claim 1, wherein the method further comprises a step of utilizing a rule application module for analyzing the trip information and processing the behavior analysis,
whereby the rule application module comprises information unit verification technologies.

15. An apparatus for automatically analyzing the behavior of at least a person in a physical space based on measurement of the trip of the person, comprising:
 a) means for capturing a plurality of input images of the person by a plurality of means for capturing images,
 b) means for processing the plurality of input images in order to track the person in each field of view of the plurality of means for capturing images,
 c) means for finding information for the trip of the person in the physical space based on the processed results from the plurality of tracks, and
 d) means for analyzing the behavior of the person based on the trip information,
wherein the trip information comprises coordinates of positions and temporal attributes of the plurality of tracks for the person.

16. The apparatus according to claim 15, wherein the apparatus further comprises:
 a) means for repeatedly using means a) through d) in claim 15 for each person in a plurality of persons, and
 b) means for measuring the behavior of the plurality of persons by aggregating the trip information for each person.

17. The apparatus according to claim 15, wherein the apparatus further comprises means for extracting statistical data from the trip information,
wherein the data comprises a traffic distribution, a shopping distribution, a shopping conversion, a category-level traffic distribution, a category-level shopping distribution, and a category-level shopping conversion.

18. The apparatus according to claim 17, wherein the apparatus further comprises means for generating layers of information based on the statistical data,
wherein the layers comprise a layer for traffic distribution, a layer for shopping distribution, a layer for shopping conversion, a layer for category-level traffic distribution, a layer for category-level shopping distribution, and a layer for category-level shopping conversion.

19. The apparatus according to claim 18, wherein the apparatus further comprises means for generating a map utilizing at least one layer from the layers of information, wherein a combination of the layers can generate a map that represents complex behavior analyses.

20. The apparatus according to claim 17, wherein the apparatus further comprises means for generating a map based on the extracted statistical data,
whereby the map comprises a traffic distribution map, a shopping distribution map, a shopping conversion map, a category-level traffic distribution map, a category-level shopping distribution map, and a category-level shopping conversion map.

21. The apparatus according to claim 17, wherein the apparatus further comprises means for processing the behavior analysis based on the statistical data,
wherein the behavior analysis comprises map generation, quantitative category measurement, dominant path measurement, category correlation measurement, and category sequence measurement.

22. The apparatus according to claim 21, wherein the apparatus further comprises means for processing a category-level path analysis for the quantitative category measurement.

23. The apparatus according to claim 21, wherein the apparatus further comprises means for calculating a decision pattern of the person based on the dominant path measurement, whereby neighboring regions for the path direction can be defined either at point-level or at polygon-level, depending on the predefined granularity of the neighboring region.

24. The apparatus according to claim 21, wherein the apparatus further comprises means for calculating an optimal distance between categories based on the category correlation measurement.

25. The apparatus according to claim 21, wherein the apparatus further comprises means for calculating the order of categories based on the category sequence measurement, whereby the order of categories shows the order of a customer's shopping engagement.

26. The apparatus according to claim 15, wherein the apparatus further comprises means for analyzing the stopping power based on the temporal attributes, whereby the temporal attributes comprise trip time and trip length.

27. The apparatus according to claim 15, wherein the apparatus further comprises means for augmenting the trip information by domain-specific knowledge, whereby the means for applying the domain-specific knowledge comprises:
- a) means for adding behavioral attributes, calculated by the analysis of the tracking of the person to the trip information, and
- b) means for removing irrelevant data from the trip information.

28. The apparatus according to claim 15, wherein the apparatus further comprises means for utilizing a rule application module for analyzing the trip information and processing the behavior analysis, whereby the rule application module comprises information unit verification technologies.

* * * * *